United States Patent
Siu et al.

(10) Patent No.: US 12,483,136 B2
(45) Date of Patent: Nov. 25, 2025

(54) MULTIPLE PORT BIDIRECTIONAL POWER CONVERSION CIRCUIT

(71) Applicant: UNIVERSITY OF NORTH TEXAS, Dallas, TX (US)

(72) Inventors: King Man Siu, Dallas, TX (US); Wu Di, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 207 days.

(21) Appl. No.: 18/502,912

(22) Filed: Nov. 6, 2023

(65) Prior Publication Data

US 2024/0162827 A1 May 16, 2024

Related U.S. Application Data

(60) Provisional application No. 63/382,404, filed on Nov. 4, 2022.

(51) Int. Cl.
| | |
|---|---|
| *H02M 3/158* | (2006.01) |
| *H02M 1/00* | (2006.01) |
| *H02M 3/142* | (2006.01) |
| *H02M 3/335* | (2006.01) |

(52) U.S. Cl.
CPC ......... *H02M 3/158* (2013.01); *H02M 1/0067* (2021.05); *H02M 1/0074* (2021.05); *H02M 1/008* (2021.05); *H02M 3/142* (2013.01); *H02M 3/33584* (2013.01)

(58) Field of Classification Search
CPC .. H02M 3/158; H02M 1/0067; H02M 1/0074; H02M 1/008; H02M 3/142; H02M 3/33584

See application file for complete search history.

(56) References Cited

U.S. PATENT DOCUMENTS

| | | | |
|---|---|---|---|
| 8,576,591 B2 * | 11/2013 | Phadke | H02J 1/10 363/124 |
| 10,291,123 B2 * | 5/2019 | Lehn | H02M 3/158 |
| 10,574,144 B1 * | 2/2020 | Ramabhadran | H02M 1/14 |
| 11,159,097 B2 * | 10/2021 | Chen | H02M 7/537 |
| 2002/0118556 A1 * | 8/2002 | Johnson, Jr. | H02M 1/10 363/123 |
| 2007/0216319 A1 * | 9/2007 | Wai | H02M 3/1584 315/247 |
| 2008/0309301 A1 * | 12/2008 | Shimada | H02M 3/158 323/282 |
| 2010/0133912 A1 * | 6/2010 | King | H02M 3/1582 307/82 |
| 2011/0227418 A1 * | 9/2011 | Pyboyina | H02J 9/062 307/75 |

(Continued)

*Primary Examiner* — Yusef A Ahmed
(74) *Attorney, Agent, or Firm* — Andrew M. Metrailer; Conley Rose, P.C.

(57) ABSTRACT

In some examples, a circuit includes a first power converter cell and a second power converter cell. The first power converter cell has a first bidirectional interface. The first power converter cell is configured to switch power from the first bidirectional interface to a second bidirectional interface in a first operation mode. The second power converter cell has a third bidirectional interface. The second power converter cell is configured to switch power from the third bidirectional interface to the second bidirectional interface in the first operation mode in parallel with the first power converter cell.

13 Claims, 14 Drawing Sheets

(56) References Cited

U.S. PATENT DOCUMENTS

| | | | |
|---|---|---|---|
| 2013/0038130 A1* | 2/2013 | Lai | H02J 3/381 |
| | | | 307/80 |
| 2017/0054364 A1* | 2/2017 | Ferdowsi | H02M 3/1584 |
| 2018/0019688 A1* | 1/2018 | Wang | H02J 3/381 |
| 2018/0076628 A1* | 3/2018 | Fu | H02M 3/156 |
| 2018/0175743 A1* | 6/2018 | Mizokami | H02M 7/53803 |
| 2020/0067412 A1* | 2/2020 | Dilley | H02M 3/1582 |
| 2020/0153336 A1* | 5/2020 | Mihai | H02J 7/35 |
| 2020/0220466 A1* | 7/2020 | Backman | H02M 3/33523 |
| 2021/0057991 A1* | 2/2021 | McBryde | H02M 3/1582 |
| 2021/0218342 A1* | 7/2021 | Zmood | H02M 7/23 |
| 2021/0281094 A1* | 9/2021 | Kwon | H02M 1/007 |
| 2022/0407423 A1* | 12/2022 | Chen | H02M 3/1586 |
| 2023/0006564 A1* | 1/2023 | Elsayad | H02M 7/4826 |
| 2023/0013025 A1* | 1/2023 | Kumar | H02M 1/0095 |
| 2024/0048072 A1* | 2/2024 | Chen | H02M 1/0048 |
| 2025/0030356 A1* | 1/2025 | Chen | H02M 1/0083 |
| 2025/0070672 A1* | 2/2025 | Xia | H02M 3/158 |

* cited by examiner

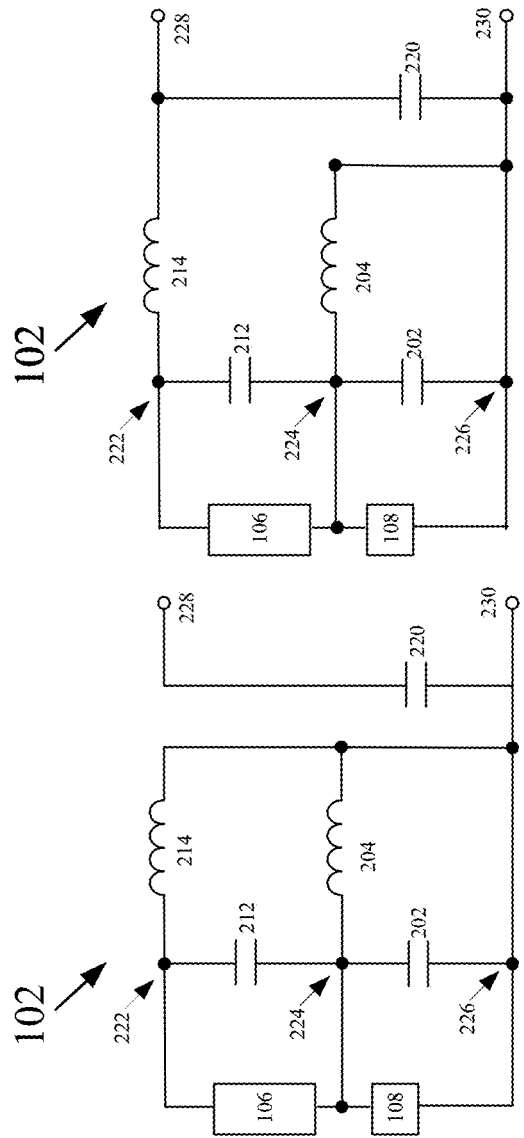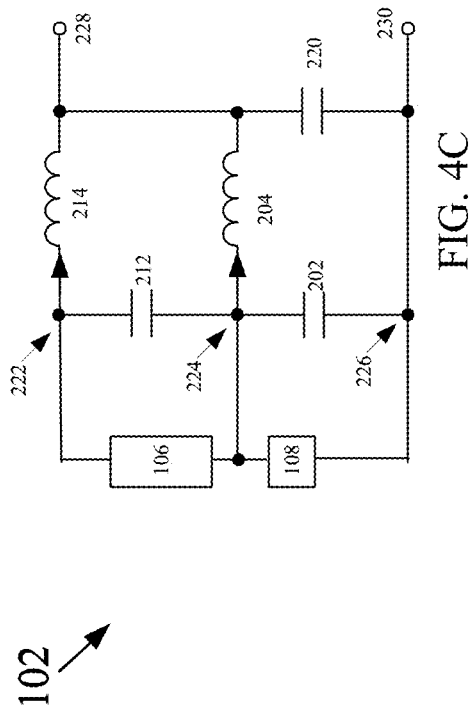
FIG. 4A
FIG. 4B
FIG. 4C

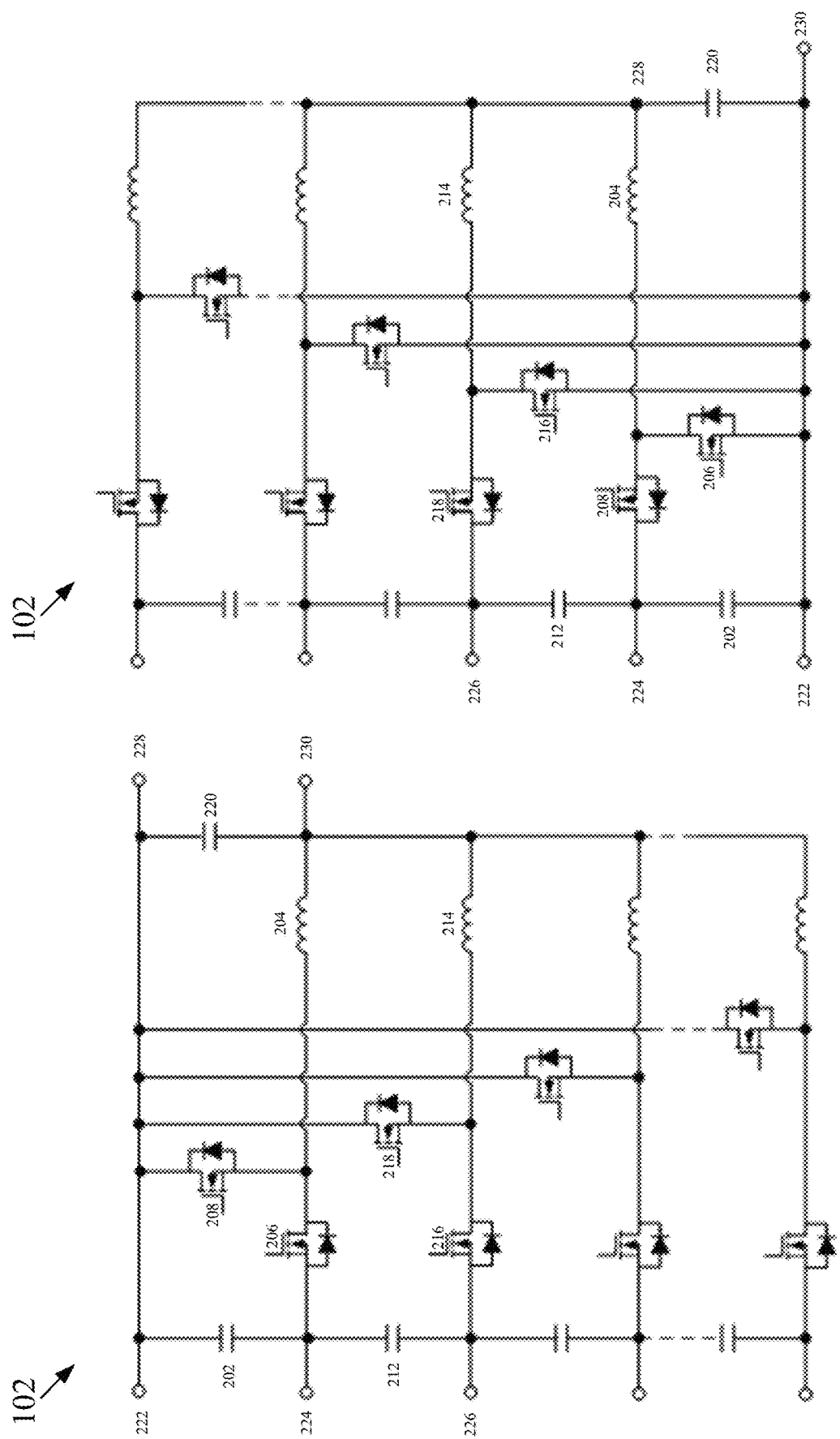

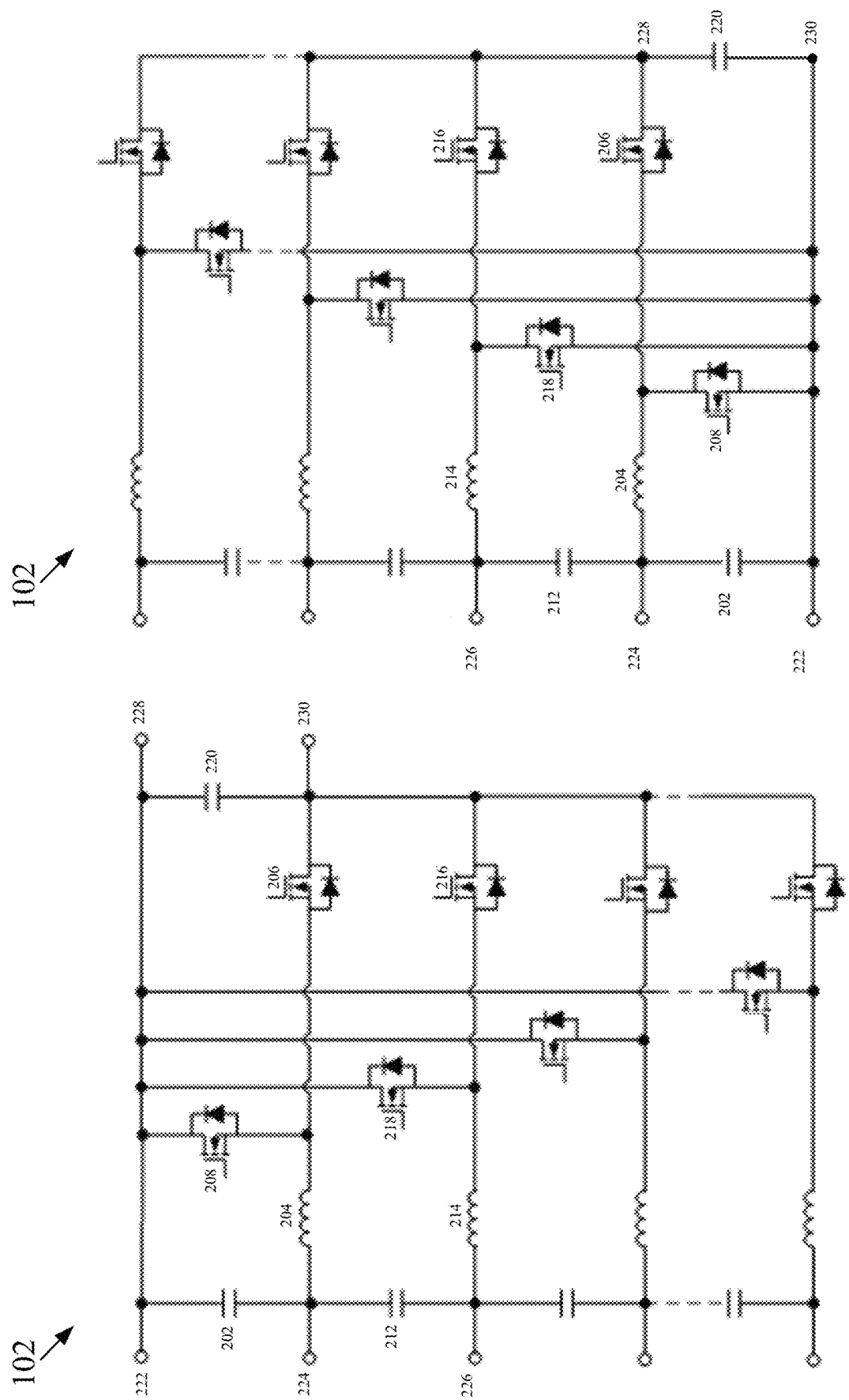

MULTIPLE PORT BIDIRECTIONAL POWER CONVERSION CIRCUIT

CROSS-REFERENCE TO RELATED APPLICATIONS

The present application claims priority to U.S. Provisional Patent Application No. 63/382,404, which was filed Nov. 4, 2022, is titled "MULTIPLE PORT BIDIRECTIONAL POWER CONVERSION CIRCUIT," and is hereby incorporated herein by reference in its entirety.

BACKGROUND

Distributed energy generators, such as photovoltaic systems, energy storage elements such as batteries, and electrical loads, such as light emitting diode (LED) lighting, may include direct current (DC) connections. As a result, energy harvesting systems, or distributed energy grids, may utilize DC to transmit electrical energy.

SUMMARY

In some examples, a circuit includes a first power converter cell and a second power converter cell. The first power converter cell includes a first capacitor having first and second terminals, the first terminal of the first capacitor coupled to a first node and the second terminal of the first capacitor coupled to a second node. The first power converter cell also includes a first inductor having first and second terminals, the first terminal of the inductor coupled to the first node. The first power converter cell also includes a first switch having a control terminal and first and second terminals, the first terminal of the first switch coupled to the second terminal of the first inductor, and the second terminal of the first switch coupled to the second node. The first power converter cell also includes a second switch having a control terminal and first and second terminals, the first terminal of the second switch coupled to a third node, and the second terminal of the second switch coupled to the second terminal of the first inductor. The second power converter cell includes a second capacitor having first and second terminals, the first terminal of the second capacitor coupled to a fourth node and the second terminal of the second capacitor coupled to the first node. The second power converter cell also includes a second inductor having first and second terminals, the first terminal of the second inductor coupled to the fourth node. The second power converter cell also includes a third switch having a control terminal and first and second terminals, the first terminal of the third switch coupled to the second terminal of the second inductor, and the second terminal of the third switch coupled to the second node. The second power converter cell also includes a fourth switch having a control terminal and first and second terminals, the first terminal of the fourth switch coupled to the third node, and the second terminal of the fourth switch coupled to the second terminal of the second inductor.

In some examples, a circuit includes a first power converter cell and a second power converter cell. The first power converter cell includes a first capacitor having first and second terminals, the first terminal of the first capacitor coupled to a first node and the second terminal of the first capacitor coupled to a second node. The first power converter cell also includes a first switch having a control terminal and first and second terminals, the first terminal of the first switch coupled to the first node. The first power converter cell also includes a first inductor having first and second terminals, the first terminal of the inductor coupled to the second terminal of the first switch, and the second terminal of the inductor coupled to the second node. The first power converter cell also includes a second switch having a control terminal and first and second terminals, the first terminal of the second switch coupled to the second terminal of the second switch, and the second terminal of the second switch coupled to a third node. The second power converter cell includes a second capacitor having first and second terminals, the first terminal of the second capacitor coupled to a fourth node and the second terminal of the second capacitor coupled to the first node. The second power converter cell also includes a third switch having a control terminal and first and second terminals, the first terminal of the third switch coupled to the fourth node. The second power converter cell also includes a second inductor having first and second terminals, the first terminal of the second inductor coupled to the second terminal of the third switch, and the second terminal of the second inductor coupled to the second node. The second power converter cell also includes a fourth switch having a control terminal and first and second terminals, the first terminal of the fourth switch coupled to the second terminal of the third switch, and the second terminal of the fourth switch coupled to the third node.

In some examples, a circuit includes a first power converter cell and a second power converter cell. The first power converter cell has a first bidirectional interface. The first power converter cell is configured to switch power from the first bidirectional interface to a second bidirectional interface in a first operation mode. The second power converter cell has a third bidirectional interface. The second power converter cell is configured to switch power from the third bidirectional interface to the second bidirectional interface in the first operation mode in parallel with the first power converter cell.

BRIEF DESCRIPTION OF THE DRAWINGS

FIG. 4A is an operation diagram showing the functional arrangement of components based on control of a controller, in accordance with various examples.

FIG. 4B is an operation diagram showing the functional arrangement of components based on control of a controller, in accordance with various examples.

FIG. 4C is an operation diagram showing the functional arrangement of components based on control of a controller, in accordance with various examples.

FIG. 17 is a schematic diagram of a converter, in accordance with various examples.

FIG. 18 is a schematic diagram of a converter, in accordance with various examples.

FIG. 19 is a schematic diagram of a converter, in accordance with various examples.

FIG. 20 is a schematic diagram of a converter, in accordance with various examples.

DETAILED DESCRIPTION

Figure 1:
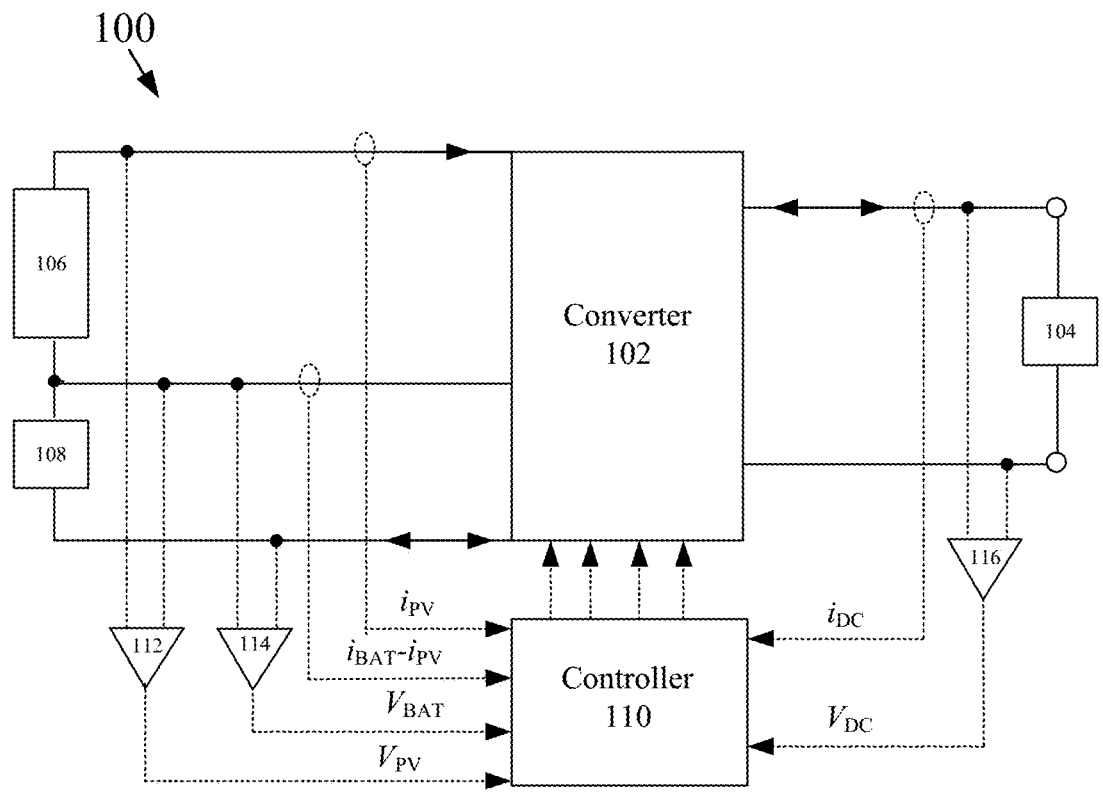
FIG. 1 is a block diagram of a power delivery system, in accordance with various examples.

Direct current (DC) system may have various advantages compared to alternating current (AC) systems, such as reduced transmission and distribution losses in the DC systems compared to AC systems, resulting in increased efficiency and reduced energy consumption in the DC systems. The DC systems may also reduce a need for AC transformers, and produce fewer electrical fields than AC systems. As a result, the popularity of implementing DC systems in various application environments has also increased. However, DC systems often include interfaces that support stand-alone applications and have various other characteristics that limit system efficiency, power density, and stability when forming a distributed energy network. Various attempts have been made to provide DC systems suitable for a distributed energy network and which address the above challenges. However, these attempts have their own challenges, such as a lack of support for bidirectional power flow, an increased active component count, or an ability to charge a battery from a load, but not from an alternative source, such as a renewable source.

Examples of this description provide for a bidirectional multiport DC-DC converter, which may be referred to herein as a multiport system. Examples of the multiport system provide for bidirectional power flow between and among multiple power sources and loads coupled to the multiport system. The multiport system includes multiple buck-boost power converters coupled in a differential converter arrangement in which an energy storage element assists in power conversion from a source to a load. In some examples, the source is a renewable source, such as a photovoltaic or solar power source and the energy storage element is a battery. The multiport system is controlled by a controller according to a modulation scheme that controls which of the battery and/or the source are providing power to a load at a given time. In some examples, the modulation scheme reduces a buck-boost ratio required for the multiport system to convert a lower voltage signal from the source into a higher voltage signal for a load.

In some examples, the modulation scheme further provides for multiple operation modes of the multiport system. For example, in a multiport system including a renewable source, a battery, and a load, the operation modes may include: double-in-single-out (DISO), single-in-double-out (SIDO), single-in-single-out (SISO) renewable-battery, SISO battery-load, SISO load-battery, and SISO renewable-load. In an example, the DISO operation mode is a three-port mode in which power flows from both the renewable source and the battery to the load. In an example, the SIDO operation mode is a three-port mode in which power flows from the renewable source to both the battery and the load. In the SISO renewable-battery mode of operation, power flows from the renewable source to the battery. In the SISO battery-load operation mode, power flows from the battery to the load. In the SISO load-battery operation mode, power flows from the load to the battery. In the SISO renewable-load operation mode, power flows from the renewable source to the load. In this way, power may be provided to the load, provided to the battery to charge the battery, or both.

FIG. 1 is a block diagram of a power delivery system 100, in accordance with various examples. In an example, the system 100 includes a bidirectional multiport DC-DC converter 102, a load 104, a first source 108, and a second source 106. While two sources (e.g., the first source 108 and the second source 106) are shown and described with respect to the system 100, in various application environments the system 100 may include any number of sources deemed suitable for a particular application environment. In an example, the first source 108 is a source capable of energy harvesting, such as a renewable source. For example, the second source 106 may be a solar or other photovoltaic source, a wind source, a tidal source (such as for providing hydro-electric power), a geothermal source, or the like. In some examples, the second source 106 is another source capable of energy harvesting. In other examples, the first source 108 is an energy storage element, such as a battery, a super capacitor, a capacitor array, or the like.

In an example, the system 100 facilitates multiple operation modes of the converter 102 with respect to the load 104, the first source 108, and the second source 106. For example, the converter 102 may be capable of operating in any of the DISO, SIDO, SISO renewable-battery, SISO battery-load, SISO load-battery, or SISO renewable-load operation modes, as described above. In an example, the system 100 includes, or is coupled to, a controller 110. The controller 110 may be configured to control one or more components of the converter 102, such as switching devices (not shown) to implement the multiple operation modes via the converter 102.

For example, the controller 110 provides control signals to the converter 102. Based on values of the control signals, switching elements of the converter 102 are placed into a particular switch arrangement. Based on the switch arrangement, power is provided from the first source 108 and the second source 106 to the load 104, from the second source 106 and the load 104 to the first source 108, from the second source 106 to the load 104 and the first source 108, from the first source 108 to the load 104, from the second source 106 to the load 104, from the second source 106 to the first source 108, or from the load 104 to the first source 108. To provide the power as described above, the converter 102 includes components (not shown) suitable for implementing a buck-boost circuit topology. In other examples, the components may be suitable for implementing one of a buck circuit topology or a boost circuit topology.

In some examples, the controller 110 receives one or more feedback signals in the system 100. For example, the controller 110 receives a signal representative of current of the second source 106 ($i_{PV}$), a signal representative of a difference between a current of the first source 108 ($i_{BAT}$) and $i_{PV}$, a signal representative of a voltage of the second source 106 ($V_{PV}$), a signal representative of a voltage of the first source 108 ($V_{BAT}$), a signal representative of current of the load ($i_{DC}$), and a signal representative of a voltage of the load 104 ($V_{DC}$). In some examples, the system 100 includes differential amplifiers 112, 114, and 116 to provide $V_{PV}$, $V_{BAT}$, and $V_{DC}$, respectively. In at least some examples, the controller 110 determines and/or provides the control signals at least partially based on values of the received feedback signals.

Figure 2:
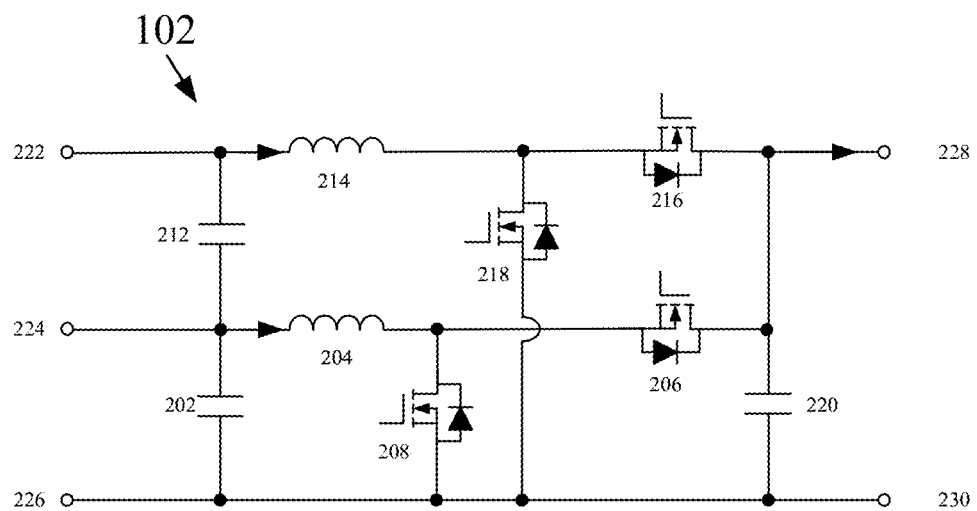
FIG. 2 is a schematic diagram of a converter, in accordance with various examples.

FIG. 2 is a schematic diagram of the converter 102, in accordance with various examples. In some examples, the converter 102 implements a boost circuit topology. For example, the converter 102 includes a capacitor 202, an inductor 204, a switch 206, and a switch 208. The converter 102 also includes a capacitor 212, an inductor 214, a switch 216, and a switch 218. The converter 102 may also include a capacitor 220. Each of the components of the converter 102 are coupled as shown in FIG. 2. In some examples, the first source 108 of FIG. 1 may be coupled between a node 224 and a node 226 of the converter 102, and the second source 106 if FIG. 1 may be coupled between the node 222 and a node 224 of the converter 102. The load 104 of FIG. 1 may be coupled between a node 228 and a node 230 of the converter 102. In an example, the node 224 and the node 226 together form a first port, which may also be referred to as a bidirectional interface or DC input interface. In an example, the node 222 and the node 224 together form a second port, which may also be referred to as a bidirectional interface or DC input interface. In an example, the node 228 and the node 230 together form a third port, which may also be referred to as a bidirectional interface or DC output interface.

In some examples, the switch 206, the switch 208, the switch 216, and the switch 218 are each semiconductor devices, such as transistors. In some examples, the transistors are field effect transistors (FETs), such as n-channel enhancement mode FETs. Each transistor may have a first terminal, a second terminal, and a control terminal. Each transistor further has a bulk diode inherently present in the transistor and coupled between the first terminal and the second terminal. In some examples, one or more of the switches, such as the switch 206, may be replaced by a diode based on an application environment in which the converter 102 is implemented.

In an example, the converter 102 receives control signals 206Ctrl, 208Ctrl, 216Ctrl, and 218Ctrl for controlling the switches 206, 208, 216, 218. The control signals may be received from a controller, such as the controller 110 of FIG. 1. Responsive to values of the control signals 206Ctrl, 208Ctrl, 216Ctrl, and 218Ctrl, the switches 206, 208, 216, 218, respectively, enter a forward conductive, or non-conductive state. For example, responsive to a control signal having an asserted, or logic high, value, a respective switch becomes conductive. Responsive to a control signal having a deserted, or logic low, value, a respective switch becomes non-conductive.

In an example, the switches 206, 208, 216, 218 are switched based on the control signals 206Ctrl, 208Ctrl, 216Ctrl, and 218Ctrl, respectively, to control the converter 102 to operate in the DISO, SIDO, SISO renewable-battery, SISO battery-load, SISO load-battery, or SISO renewable-load operation modes, as described above. For example, in the DISO operation mode, the control signals control the switches 206, 208 to form a first boost circuit between the first source 108 and the load 104, and control the switches 216, 218 to form a second boost circuit between the second source 106 and the load 104. In the DISO operation mode, a voltage of the first source 108 is increased and provided to the load 104, and a voltage of the second source 106 is increased and provided to the load 104. By supplementing switching of the second source 106 to the load 104 with switching of the first source 108, a boost ratio of the second source 106 with respect to the load 104 is decreased. By decreasing the boost ratio, conversion efficiency of the converter 102 is increased though reduced switching and component signal loss. In an example, a negative terminal of the first source 108 is at a virtual ground, and the first source 108, when implemented as a battery, is a short circuit in high-frequency analysis. As a result, the negative terminal of the first source 108 can be considered as coupled to ground through the second source 106.

Although not shown in FIG. 2, in some examples an alternative embodiment of the converter 102 replaces the boost topology with a buck topology. In such an example, the converter 102 may decrease a value of a signal provided by the second source 106 to charge the first source 108, in examples in which the first source 108 is a battery or other energy storage element, and to provide a signal to the load 104.

Figure 3:
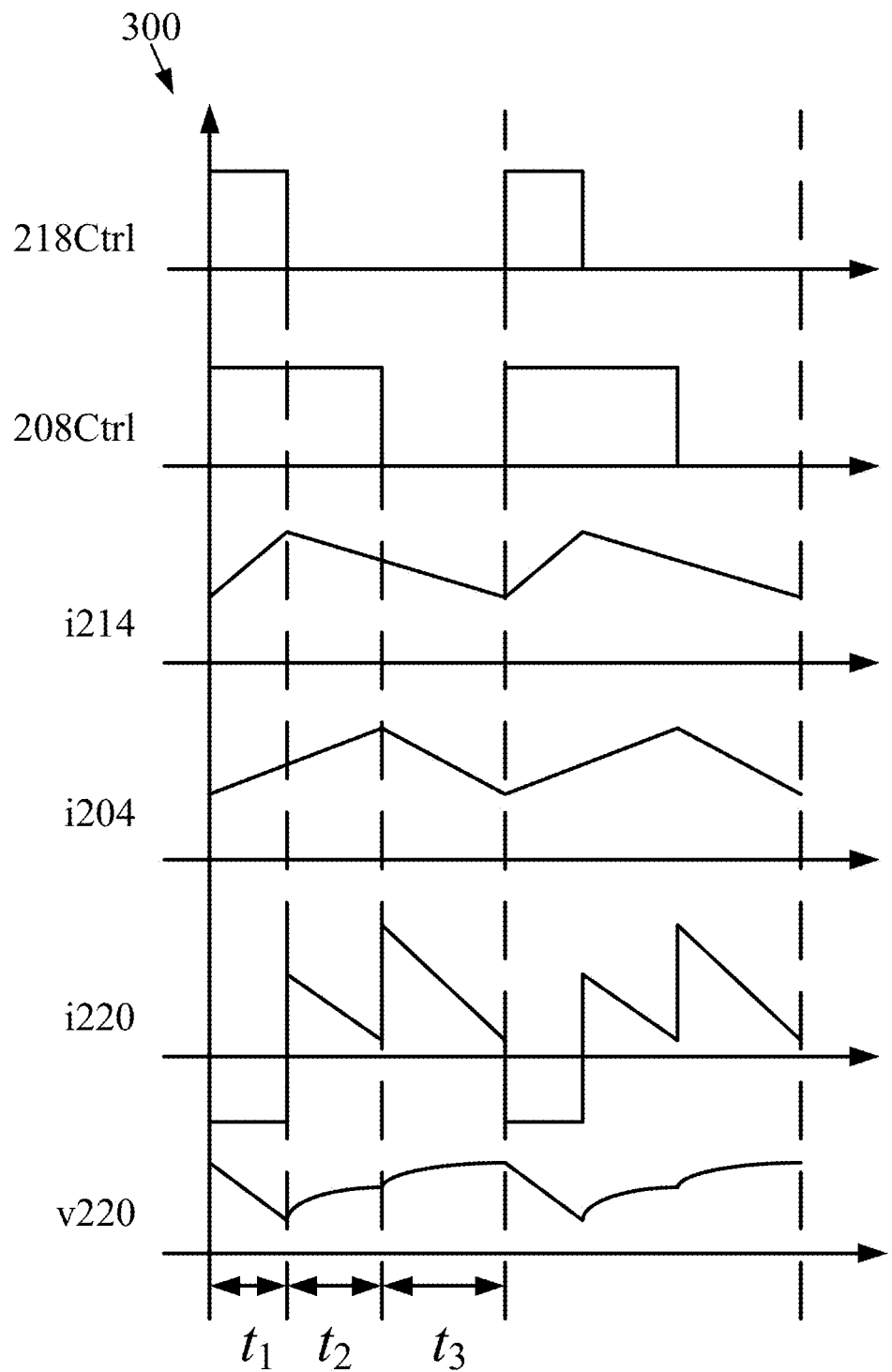
FIG. 3 is a signal diagram of example signals in a converter, in accordance with various examples.

A signal diagram 300 of example signals in the converter 102 while operating in the DISO operation mode is shown in FIG. 3. FIG. 3 includes 208Ctrl, 218Ctrl, a signal (i204) representative of a current of the inductor 204, a signal (i214) representative of a current of the inductor 214, a signal (i220) representative of a current of the capacitor 220, and a signal (v220) representative of a voltage of the capacitor 220. In an example, 206Ctrl and 216Ctrl have deserted values and are not shown in FIG. 3. In an example, a modulation scheme implemented by the controller 110 for implementing the DISO operation mode includes time periods $t_1$, $t_2$, and $t_3$. In an example, 206Ctrl has an asserted value for a duration of $t_1$, and 216Ctrl has an asserted value for a duration of $t_1+t_2$. i204 increases in value during $t_1$ and decreases in value for $t_2+t_3$. Similarly, i214 increases in value for $t_1+t_2$, and decreases in value during $t_3$. Based on the current of the inductors 204, 206, as shown in i204 and i214, current and voltage of the capacitor 220 change as shown by i220 and v220, respectively. In an example, v220 is approximately equal to a voltage provided to the load 104, which may be coupled in parallel with the capacitor 220.

FIGS. 4A, 4B, and 4C are schematic diagrams of the converter 102 of FIG. 2 as controlled by the controller 110 in times periods $t_1$, $t_2$, and $t_3$, respectively. For example, FIG. 4A is an operation diagram showing the functional arrangement of components based on control of the controller 110 during time period $t_1$. FIG. 4B is an operation diagram showing the functional arrangement of components based on control of the controller 110 during time period $t_2$. FIG. 4C is an operation diagram showing the functional arrangement of components based on control of the controller 110 during time period $t_3$.

Returning to FIG. 2, in some examples, power flow in the converter 102 may be controlled according to a charging or discharging current of the second source 106, in examples in which the first source 108 is a battery. For example, an output current of the converter 102 may be represented according to the following equation 1 for each of the operation modes of the converter 102.

$$i_{DC}(t) = i_{PV}(t)\frac{V_{PV}}{V_{DC}} + i_{BAT}(t)\frac{V_{BAT}}{V_{DC}} \quad (1)$$

In equation 1, $i_{DC}$ is representative of a load, or output, current of the converter 102, $i_{PV}$ is representative of a current flowing from the second source 106 into the converter 102, $i_{BAT}$ is representative of a current flowing from the first source 108 into the converter 102, $V_{DC}$ is representative of a load, or output, voltage of the converter 102, $V_{PV}$ is representative of a voltage of the second source 106, and $V_{BAT}$ is representative of a voltage of the first source 108. As shown by equation 1, an output current of the converter 102 is supported by two different energy sources (e.g., the first source 108 and the second source 106) resulting from a differential boost topology of the converter 102. Thus, by controlling the polarity of the current of the first source 108, an output current direction of the converter 102 may be controlled. Similarly, by disabling one of the first source 108 or the second source 106, a standalone system may be formed with the non-disabled source.

Based on the operation of the converter 102 as described above in FIGS. 2, 3, 4, a duty cycle of the converter 102 with respect to both the first source 108 and the second source 106 is determinable according to the following equation 2 and equation 3 in which $D_1$ is a duty cycle of the first boost topology for providing current to the load 104 from the first source 108, and $D_2$ is a duty cycle of the second boost topology for providing current to the load 104 from both the first source 108 and the second source 106.

$$D_1(t) = 1 - \frac{V_{BAT}}{V_{DC}} \quad (2)$$

$$D_2(t) = 1 - \frac{V_{PV} + V_{BAT}}{V_{DC}} \quad (3)$$

As shown in FIG. 3 by the signals i204 and i214, inductor currents of the inductors 204, 214, respectively, vary over time, at least partially according to the duty cycles $D_1$ and $D_2$. In an example, the inductor currents may be determined according to the following equation 4 for the inductor 204 and equation 5 for the inductor 214.

$$i_{L1}(t) = \begin{cases} \overline{i_{L1}} = i_{PV} \\ \Delta i_{L1} = \frac{1}{L_1 \cdot f_{sw}} \frac{(V_{PV} + V_{BAT}) \cdot (V_{DC} - V_{PV} - V_{BAT})}{V_{DC}} \end{cases} \quad (4)$$

$$i_{L2}(t) = \begin{cases} \overline{i_{L2}} = i_{BAT} - i_{PV} \\ \Delta i_{L2} = \frac{1}{L_2 \cdot f_{sw}} \frac{V_{BAT} \cdot (V_{DC} - V_{BAT})}{V_{DC}} \end{cases} \quad (5)$$

In the above equation 4, current of the inductor 204 is represented as $i_{L1}$, having a fundamental component $\overline{i_{L1}}$ and a ripple component $\Delta i_{L1}$. In the above equation 5, current of the inductor 214 is represented as $i_{L2}$, having a fundamental component $\overline{i_{L2}}$ and a ripple component $\Delta i_{L2}$. In both equation 4 and equation 5, a switching frequency is represented as $f_{sw}$. In an example, ripple in an output voltage, both in the DISO and SISO operation modes described above, may be determined according to the following equation 6, and ripple in the output voltage in the SIDO operation mode, as described above, may be determined according to the following equation 7.

$$\Delta V_{DC} = \frac{(V_{DC} - V_{PV} - V_{BAT}) \cdot I_{DC}}{V_{DC} \cdot f_{SW} \cdot C_3} \quad (6)$$

$$\Delta V_{DC} = \frac{(V_{DC} - V_{PV} - V_{BAT}) \cdot (V_{PV} + V_{BAT}) \cdot \left(P_{MPPT} - \frac{V_{PV}}{V_{BAT}} \cdot P_{BAT}\right)}{V_{PV} \cdot V_{DC}^2 \cdot f_{SW} \cdot C_3} \quad (7)$$

In the above equations, $C_3$ is a capacitance of the capacitor 220, $P_{MPPT}$ is a power of the first source 108, and P BAT is a power of the second source 106.

In some examples, certain components of the converter 102 may be replaced by other components. For example, the converter 102 may be driven, or controlled, by the controller 110 according to an asynchronous switching scheme or a synchronous switching scheme. In the asynchronous switching scheme, at least some of the switches 206, 208, 216, 218 may be implemented as insulated gate bipolar transistors, and at least some of the switches 206, 208, 216, 218 may be implemented as diodes. In some examples, this arrangement may increase a turn off time of the switches as a result of a rapid diode recovery time, thereby decreasing switching losses in the converter 102. However, tail currents of the implementation may result in a lower switching frequency than a FET based implementation. In contrast, in the synchronous switching scheme, the switches 206, 208, 216, 218 may be implemented as FET transistors, such as metal oxide semiconductors FETs (MOSFETs). In some examples, this arrangement may increase a switching frequency at which the converter 102 is capable of operating, but suffers from greater switching losses than the insulated gate bipolar transistor and diode based implementation.

Figure 5A:
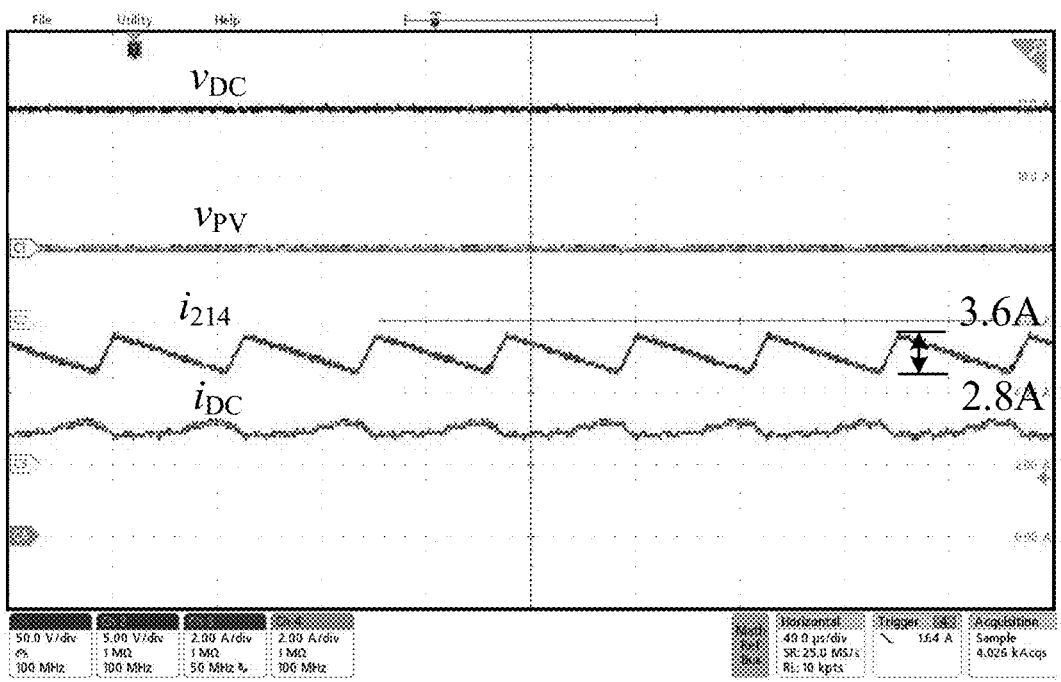
FIG. 5A is a waveform diagram of performance of a converter in accordance with various examples.
Figure 5B:
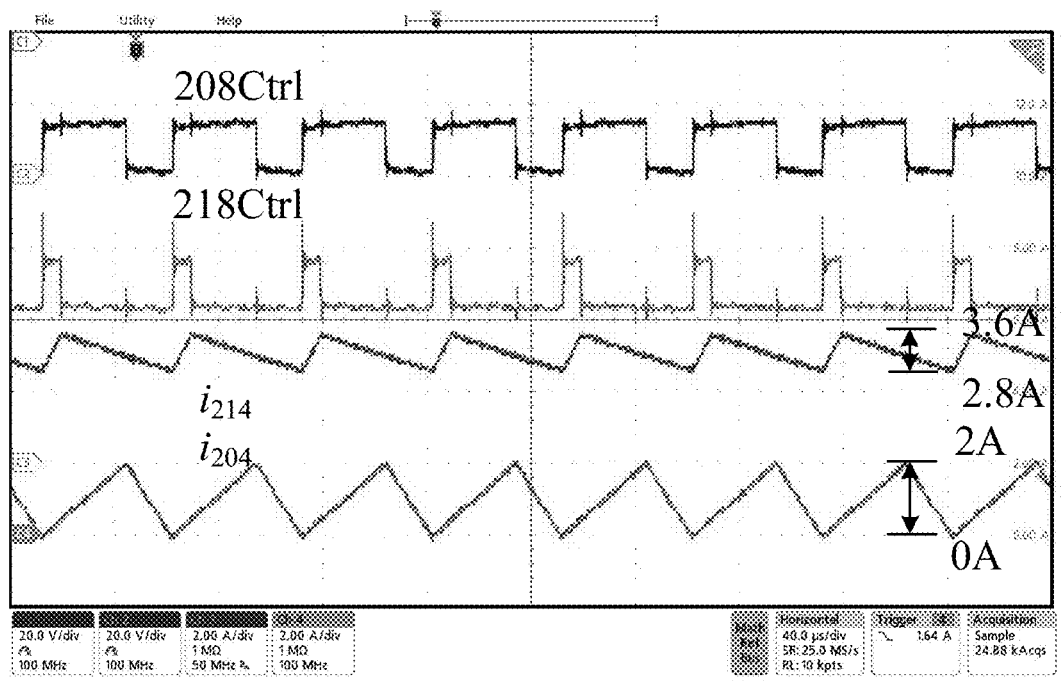
FIG. 5B is a waveform diagram of performance of a converter in accordance with various examples.

FIGS. 5A and 5B are waveform diagrams of performance of the converter 102 in accordance with various examples. In some examples, FIGS. 5A and 5B are representative of operation of the converter 102 in the DISO operation mode. FIG. 5A includes $V_{DC}$, $V_{PV}$, $i_{L1}$, and $i_{DC}$, each as described above herein. FIG. 5B includes 218Ctrl, 208Ctrl, $i_{L1}$, and $i_{L2}$, each as described above herein.

Figure 6:
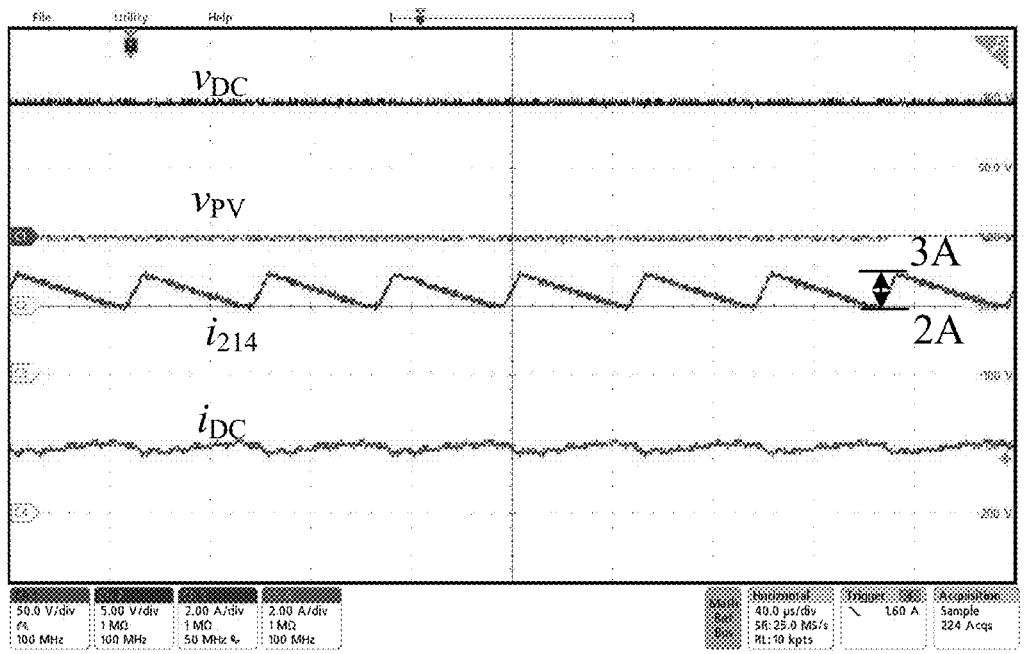
FIG. 6 is a waveform diagram of performance of a converter in accordance with various examples.
Figure 7A:
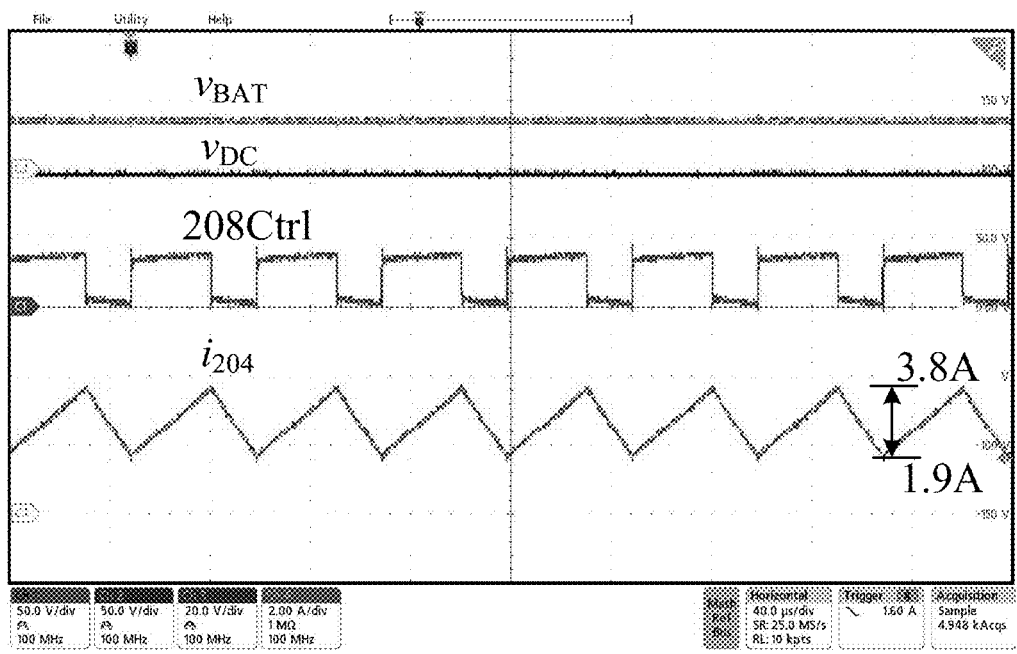
FIG. 7A is a waveform diagram of performance of a converter in accordance with various examples.
Figure 7B:
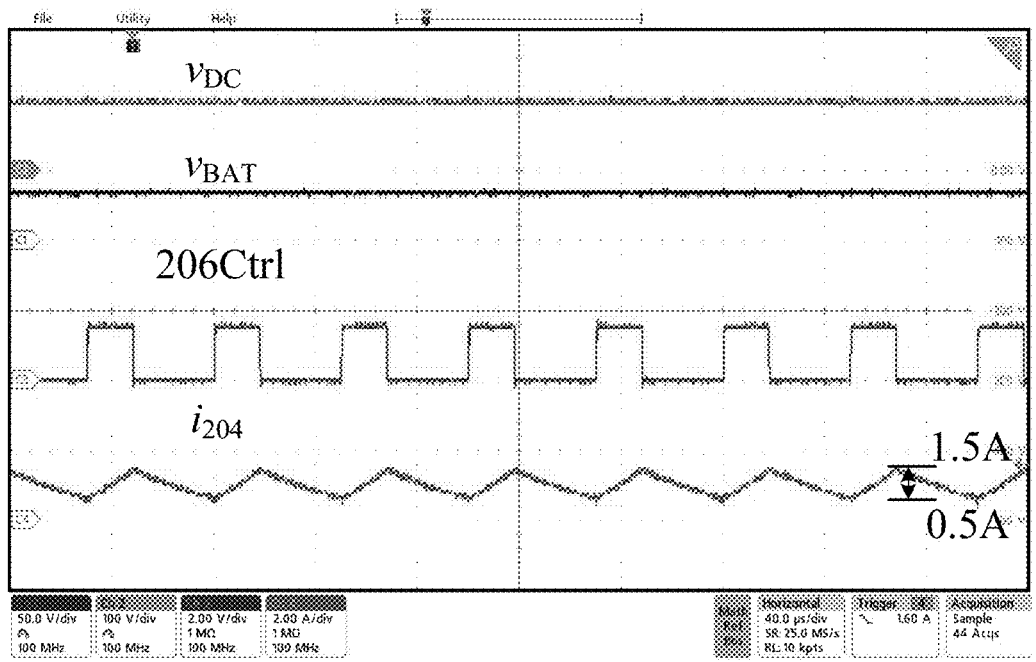
FIG. 7B is a waveform diagram of performance of a converter in accordance with various examples.

In an example, the waveforms of FIGS. 5A and 5B, as well as for the following FIGS. 6, 7A, and 7B, correspond to an example system 100 in which the second source 106 is representative of a photovoltaic source (e.g., solar panel) having a nominal voltage production of 49.8 volts (V), the first source 108 is representative of a battery having a nominal voltage of 36 V, and a load voltage of 100 V. Similarly, $P_{MPPT}$ is approximately equal to 143.3 watts (W), a maximum power point (MPP) current of the second source 106 is approximately 2.88 amperes (A), an open circuit voltage of the f second source 106 is about 61.2 V, and a short circuit current of the f second source 106 is about 3.11 A. Further, the inductors 204, 214 each have an inductance of approximately 1.2 millihenries (mH), and the capacitors 202, 212, and 220 each have a capacitance of approximately 0.56 millifarads (mF).

In the example shown by FIGS. 5A and 5B, which corresponds to operation shown in FIG. 3, as described above, power is provided to the load 104 from both the first source 108 and the second source 106 to provide a 100 V signal to the load 104. In an example, operation according to the DISO operation mode as represented in FIGS. 5A and 5B results in a decrease in duty cycle of the converter 102 from about 0.5 to about 0.14. This decrease in duty cycle results in a ripple magnitude of $i_{L2}$ ranging from about 2.8 A to about 3.6 A, and a ripple current peak-to-peak value less than about 2 A.

FIG. 6 is a waveform diagram of performance of the converter 102 in accordance with various examples. In some examples, FIG. 6 is representative of operation of the converter 102 in the SIDO operation mode. FIG. 6 includes $V_{DC}$, $V_{PV}$, $i_{L1}$, and $i_{DC}$, each as described above herein. In the SIDO operation mode, the second source 106 provides power to both the first source 108 and the load 104. As such, the SIDO operation mode includes both boost and buck operation of the converter 102. For example, the second source 106 provided power to the load 104 via a boost operation having a duty cycle of approximately 0.14, and provided power to the first source 108 via a buck operation having a duty cycle of approximately 0.36 to charge the second source 106. During the SIDO operation mode, a ripple magnitude of $i_{L2}$ ranges from about 2 A to about 3 A, and a ripple current peak-to-peak value less than about 2 A.

FIGS. 7A and 7B are waveform diagrams of performance of the converter 102 in accordance with various examples. In some examples, FIGS. 7A and 7B are representative of operation of the converter 102 in the SISO operation mode. FIG. 7A includes $V_{Battery}$, $V_{DC}$, 208Ctrl, and $i_{L1}$, each as described above herein. FIG. 7B includes $V_{DC}$, $V_{Battery}$, 208Ctrl, and $i_{L1}$, each as described above herein. As shown in FIG. 7A, power is provided from the second source 106 to the load 104 via a boost operation of the converter 102 having a duty cycle of approximately 0.64. During the SISO battery-load operation mode, a ripple magnitude of $i_{L2}$ ranges from about 1.9 A to about 3.8 A, and a ripple current peak-to-peak value less than about 2 A. As shown in FIG. 7B, power is provided from the load 104 to the first source 108 according to a buck operation of the converter 102 having a duty cycle of about 0.36. During the SISO load-battery operation mode, a ripple magnitude of $i_{L2}$ ranges from about 0.5 A to about 1.5 A, and a ripple current peak-to-peak value less than about 2 A.

Figure 8:
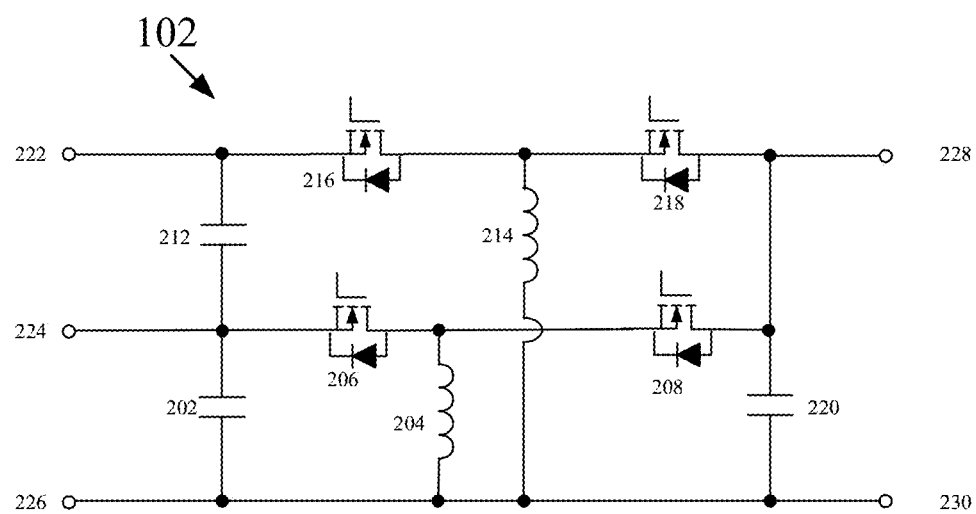
FIG. 8 is a schematic diagram of a converter, in accordance with various examples.

FIG. 8 is a schematic diagram of the converter 102, in accordance with various examples. In an example, the converter 102 is an alternative embodiment to the converter 102 of FIG. 2, as described above. In some examples, the converter 102 implements a buck-boost circuit topology using the same components as the converter 102 of FIG. 2, coupled as shown in FIG. 8. In an example, the capacitor 202, inductor 204, switch 206, and switch 208 form a first power converter, or cell, and the capacitor 212, inductor 214, switch 216, and switch 218 form a second power converter, or cell. In an example, the converter 102 of FIG. 8 receives the same control signals as the converter 102 of FIG. 2 to operate in the DISO, SIDO, SISO renewable-battery, SISO battery-load, SISO load-battery, or SISO renewable-load operation modes, as described above. However, those control signals may implement a different control scheme over the converter 102 of FIG. 8. In an example, an operation mode of the converter 102 of FIG. 8 may be selected based on $i_{PV}$, and polarity of the $i_{BAT}$. In operation, switches 206 and 208, and inductor 204 provide for the power conversion between the first source 108 and the load 104. In parallel, switches 216 and 218, and inductor 214, provide for the power conversion between the second source 106 and the load 104, with the assistance of the first source 108. Due to the involvement of the first source 108, in some examples, the effective buck-boost operation range is increased and can cover a wider range of varying input voltages provided by the second source 106.

For example, a switching pattern of the converter 102 of FIG. 8 is shown below in Table 1, in which $P_{PV}$, is a power of the second source 106, $P_{BAT}$, is a power of the first source 108, and Pic is a power of the load 104.

TABLE 1

| Mode | Condition | Switch in Cell 1 | Diode in Cell 1 | Switch in Cell 2 | Diode in Cell 2 |
|---|---|---|---|---|---|
| 1 | DISO (+$P_{PV}$, +$P_{BAT}$, & +$P_{DC}$) at $i_{Bat} > i_{PV}$ | 206 | 208 | 216 | 218 |
|  | DISO (+$P_{PV}$, -$P_{BAT}$, & -$P_{DC}$) | 208 | 206 | 216 | 218 |
|  | SIDO (+$P_{PV}$, -$P_{BAT}$, & +$P_{DC}$) | 208 | 206 | 216 | 218 |
| 2 | SISO (+$P_{PV}$ & -$P_{BAT}$) at $i_{Bat} = 0$ | 208 | 206 | 216 | 218 |
| 3 | SISO (+$P_{BAT}$ & +$P_{DC}$) | 206 | 208 | / | / |
|  | SISO (-$P_{BAT}$ & -$P_{DC}$) | 208 | 206 | / | / |
| 4 | SISO (+$P_{PV}$ & +$P_{DC}$) | 208 | 206 | 216 | 218 |

Figure 9A:
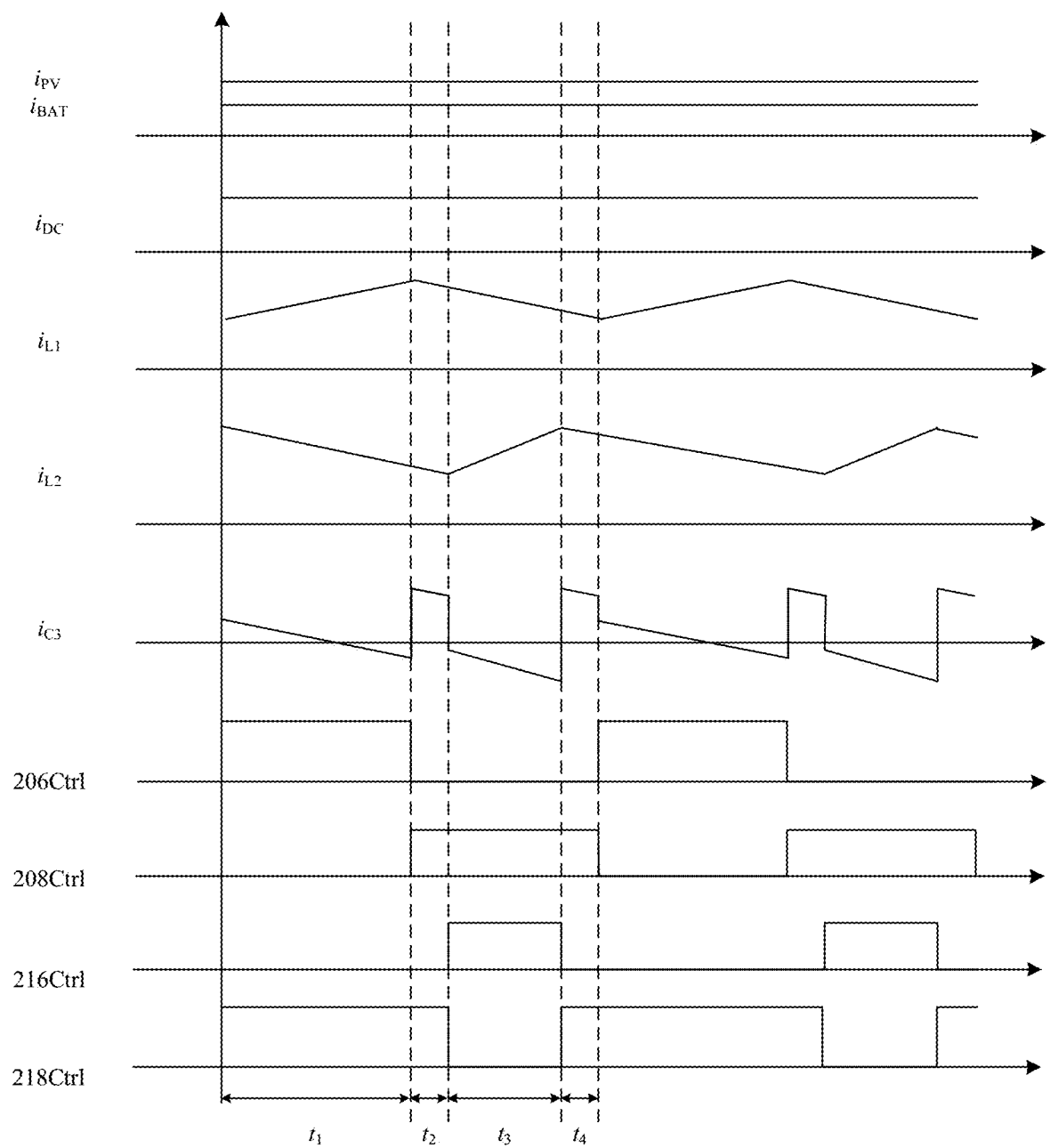
FIG. 9A is a signal diagram of example signals in a converter, in accordance with various examples.
Figure 9B:
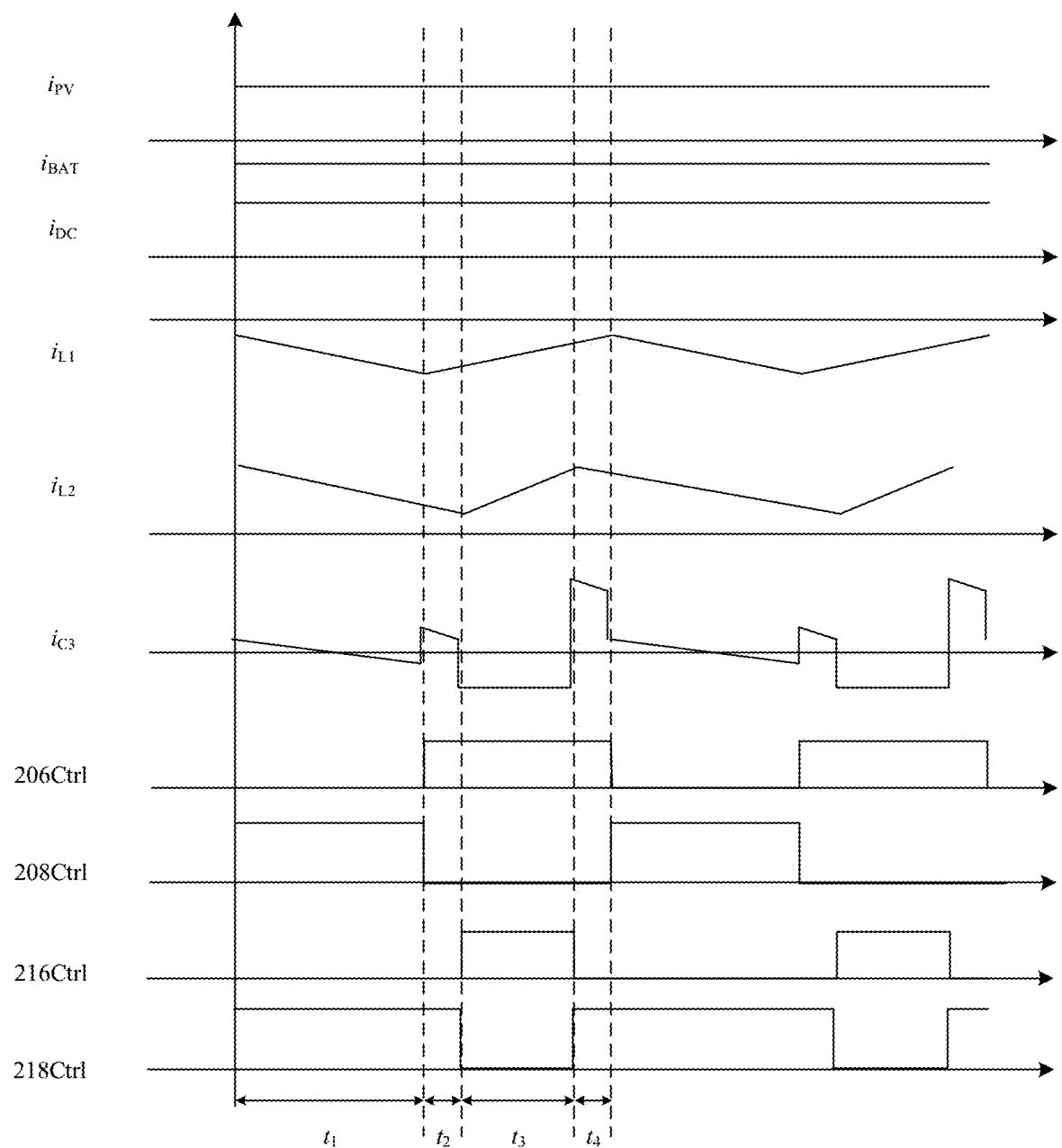
FIG. 9B is a signal diagram of example signals in a converter, in accordance with various examples.

Signal diagrams of example signals in the converter 102 of FIG. 8 are shown in FIG. 9A and FIG. 9B. For example, FIG. 9A shows a modulation scheme of the converter 102 operating in the DISO operation mode. In the example shown in FIG. 9A, 206Ctrl and 208Ctrl have a 180 degree phase difference. As a result, ripple introduced into $i_{C3}$, and resulting ripple in $i_{DC}$, are reduced. This reduction in ripple enables capacitors and inductors in the converter 102 to have reduced size, and therefore cost both in terms of component cost and size related cost in a size of the converter 102. Although not explicitly shown in FIG. 9A, a SIDO first source-second source operation mode may be substantially similar to the DISO operation mode shown with 206Ctrl and 208Ctrl having a 180 degree phase difference. However, in the SIDO first source-second source operation mode, $i_{BAT}$ may be reduced to zero. FIG. 9B shows a modulation scheme of the converter 102 operating in a SIDO operation mode. In the example of FIG. 9B, a negative differential current exists between the first source 108 and the second source 106. In such an example, 208Ctrl and 216Ctrl have a 180 degree phase difference, such as to reduce voltage ripple in $V_{DC}$. Although not explicitly shown in FIG. 9B, a SISO first source-second source operation mode may be substantially similar to the SIDO operation mode shown with 208Ctrl and 216Ctrl having a 180 degree phase difference. However, the capacitor 220 may be an energy transmission buffer such that power output by the converter 102 is approximately zero. Although not explicitly shown in FIG. 9A or 9B, in a SISO second source-load operation mode, the first source 108 may not provide power to the load 104, such that a converter cell coupled between the first source 108 and the load 104 may be inactive. In such an example, the converter 102 operates as a buck-boost converter without the added differential functionality described herein.

Returning to FIG. 8, in some examples, an output current of the converter 102 may be represented according to equation 1, as described above, for each of the operation modes of the converter 102. Based on the operation of the converter 102 as described above in FIGS. 8, 9A, 9B a duty cycle of the converter 102 with respect to both the first source 108 and the second source 106 is determinable according to the following equation 8 and equation 9 in which $D_1$ is a duty cycle of the cell for providing current to the load 104 from the first source 108 and $D_2$ is a duty cycle of the cell for providing current to the load 104 from both the first source 108 and second source 106.

$$D_1(t) = \frac{V_{DC}}{V_{BAT} + V_{DC}} \quad (8)$$

$$D_2(t) = \frac{V_{DC}}{V_{PV} + V_{BAT} + V_{DC}} \quad (9)$$

The above equations 8 and 9 may be representative of a buck-boost converter in ideal circumstances in which an infinite voltage gain is possible. In actual implementation, circuit parasitics, such as parasitic resistances, affect the voltage gain, and therefore the duty cycle, such as resulting from power dissipation by the parasitic resistances. Thus, considering a parasitic inductor resistance of the inductor 204 ($R_{L1}$) and a parasitic inductor resistance of the inductor 214 ($R_{L2}$), the above equations 8 and 9 can be modified to form the following equations 10 and 11 in which R is output resistance, and $V_{IN}$ is a sum of voltages of the first source 108 and the second source 106.

$$D_{1,R}(t) = \frac{2\frac{V_{DC}}{V_{BAT}} + 1 \pm \sqrt{1 - 4\frac{R_{L1}}{R} \cdot \frac{V_{DC}}{V_{BAT}} - 4\frac{R_{L1}}{R} \cdot \frac{V_{DC}^2}{V_{BAT}^2}}}{2\left(1 + \frac{V_{DC}}{V_{BAT}}\right)} \quad (10)$$

$$D_{2,R}(t) = \frac{2\frac{V_{DC}}{V_{IN}} + 1 \pm \sqrt{1 - 4\frac{R_{L2}}{R} \cdot \frac{V_{DC}}{V_{IN}} - 4\frac{R_{L2}}{R} \cdot \frac{V_{DC}^2}{V_{IN}^2}}}{2\left(1 + \frac{V_{DC}}{V_{IN}}\right)} \quad (11)$$

Correspondingly, a gain of the converter 102 is determinable according to the following equation 12 and 13 in which $D_{1A}$ is a duty cycle of the switch 206 and $D_{2A}$ is a duty cycle of the switch 216.

$$\frac{V_{BAT}}{V_{DC}} = \frac{1 + \frac{1}{(1-D_{1A})} \cdot \frac{R_{L1}}{R} - D_{1A}}{D_{1A}} \quad (12)$$

$$\frac{V_{IN}}{V_{DC}} = \frac{1 + \frac{1}{(1-D_{2A})} \cdot \frac{R_{L2}}{R} - D_{2A}}{D_{2A}} \quad (13)$$

Figure 10:
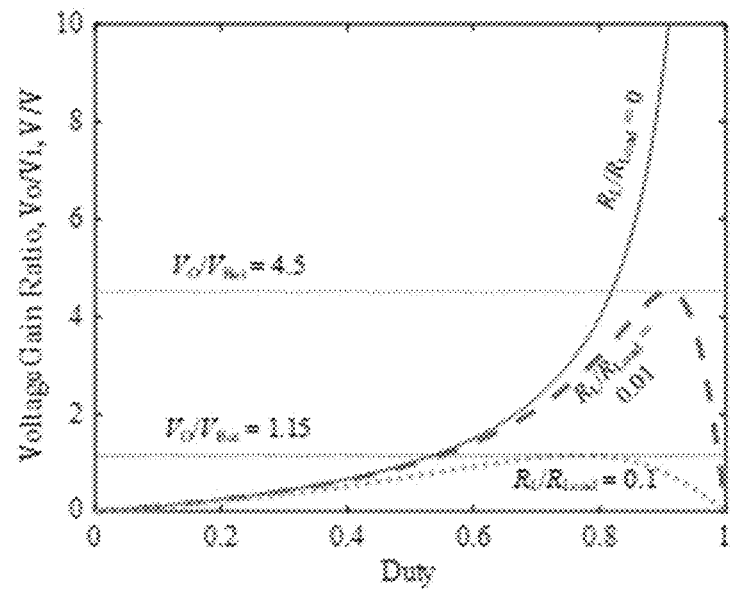
FIG. 10 is a graph shown a relationship among the duty, parasitic influence, and converter voltage gain in a converter, in accordance with various examples.

FIG. 10 is a graph showing a relationship among the duty, parasitic influence, and converter voltage gain in the converter 102, in accordance with various examples. In FIG. 10, $V_{DC}$ is shown as $V_O$ and $V_{IN}$ is shown as $V_i$. Further, a resistance of the load 104 is shown as we $R_{LOAD}$ and a parasitic resistance of the converter 102 is shown as $R_L$. As shown by FIG. 10, parasitic resistance limits the effective buck-boost converter duty. For example, if the parasitic to the load resistance ratio is high, the potential effective duty operation may be limited. In some examples, the first source 108 output characteristic has a non-linear behavior where the I-V characteristic varies under different conditions. In the example of a photovoltaic panel, the panel parameter depends on solar irradiance and environmental temperature. Thus, as the system power is varying, the location of the maximum power point is also relocated. As a result, when the photovoltaic panel is shaded, a relatively high voltage gain may be required to satisfy a voltage demand of a load, which may not able to be satisfied due to parasitic resistance.

In the converter 102 of this description, with the assistance of the first source 108 (e.g., such as a battery), the influence of the parasitic resistance on the power conversion may be reduced. By controlling a first source 108-to-load 104 voltage ratio, the converter 102 may be maintained in efficient buck-boost region. For example, if the first source 108-to-load 104 voltage ratio is set to 1, the potential duty operation range in the first cell may be 0 to 0.5, which may be capable of adapting to a wide range of possible voltage values from the first source 108.

Returning to FIG. 8, and as shown in FIGS. 9A and 9B, inductor currents of the inductors 204, 214 vary over time, at least partially according to the duty cycles $D_1$ and $D_2$. In an example, the inductor currents may be determined according to the following equation 14 for the inductor 204 and equation 15 for the inductor 214.

$$i_{L1}(t) = \begin{cases} \overline{i_{L1}} = (i_{Bat} - i_{PV}) \cdot D_1 \\ \Delta i_{L1} = \frac{1}{L_1 \cdot f_{sw}} \frac{V_{BAT} \cdot V_{DC}}{V_{DC} + V_{BAT}} \end{cases} \quad (14)$$

$$i_{L2}(t) = \begin{cases} \overline{i_{L2}} = i_{PV} \cdot D_2 \\ \Delta i_{L2} = \frac{1}{L_2 \cdot f_{sw}} \frac{V_{IN} \cdot V_{DC}}{V_{DC} + V_{IN}} \end{cases} \quad (15)$$

By specifying a maximum current ripple magnitude, inductance values for the inductors 204, 214 may be determined. In some examples, the switches 206, 208 may be selected such that a breakdown voltage of each of the switches 206, 208 is greater than or equal to the sum of voltages of the first source 108 and the second source 106. In some examples, a synchronized switching operation of the converter 102 may correspond to a heavy duty being placed on bulk diodes of the switches 206, 208. As a result, for some application environments, it may be useful to implement the switches 206, 208 as silicon (Si) MOSFET devices. In some examples, the switches 216, 218 may be selected such that a breakdown voltage of each of the switches 216, 218 is greater than or equal to the sum of voltages of the first source 108, the second source 106, and the load 104. As a result, for some application environments, it may be useful to implement the switches 216, 218 as Si MOSFET devices.

Figure 11A:
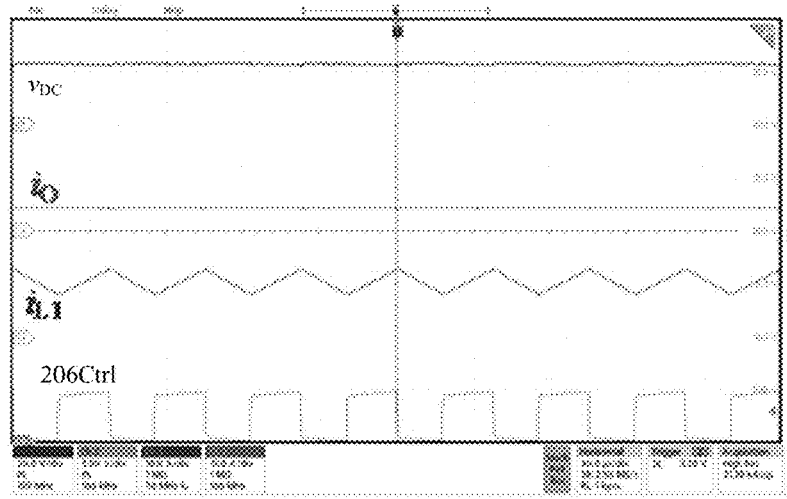
FIG. 11A is a waveform diagram of performance of a converter in accordance with various examples.
Figure 11B:
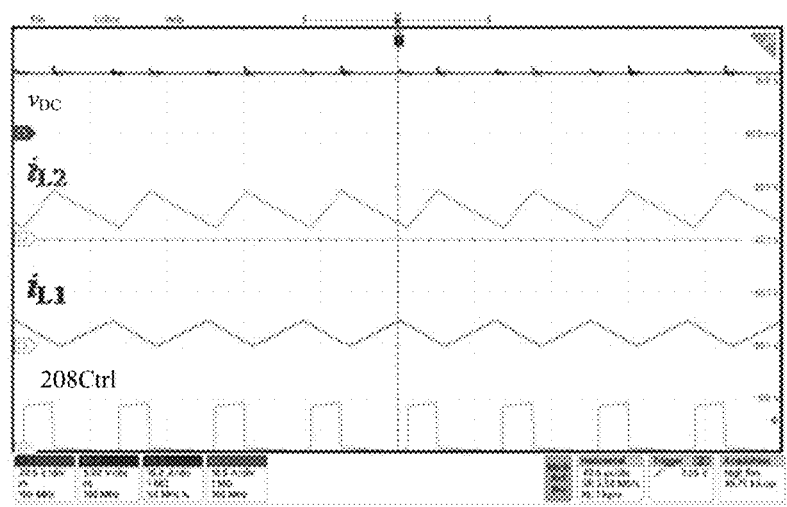
FIG. 11B is a waveform diagram of performance of a converter in accordance with various examples.

FIGS. 11A and 11B are waveform diagrams of performance of the converter 102 in accordance with various examples. In some examples, FIG. 11A is representative of operation of the converter 102 in the SISO operation mode and FIG. 11B is representative of operation of the converter 102 in the DISO operation mode. FIG. 11A includes $V_{DC}$, $i_{DC}$, and $i_{L1}$, each as described above, as well as 206Ctrl. FIG. 11B includes $V_{DC}$, $i_{L2}$, and $i_{L1}$, each as described above, as well as 208Ctrl In an example, the waveforms of FIGS. 11A and 11B, as well as for the following FIGS. 12 and 13, correspond to an example system 100 in which the second source 106 is representative of a photovoltaic source (e.g., solar panel) having a nominal voltage production of 37.1 V, the first source 108 is representative of a battery having a nominal voltage of 24 V, and a load voltage of 24 V. Similarly, $P_{MPPT}$, is approximately equal to 90.3 W, a maximum power point (MPP) voltage of the second source 106 is approximately 30.2 V, a MPP current of the second source 106 is approximately 3 A, an open circuit voltage of the first source 108 is about 37.1 V, and a short circuit current of the first source 108 is about 3.25 A, and a battery capability of the first source 108 is about 6000 milliampere-hours (mAh). Further, the inductors 204, 214 each have an inductance of approximately 0.2 mH, and the capacitors 202, 212, and 220 each have a capacitance of approximately 0.5 mF.

Figure 12:
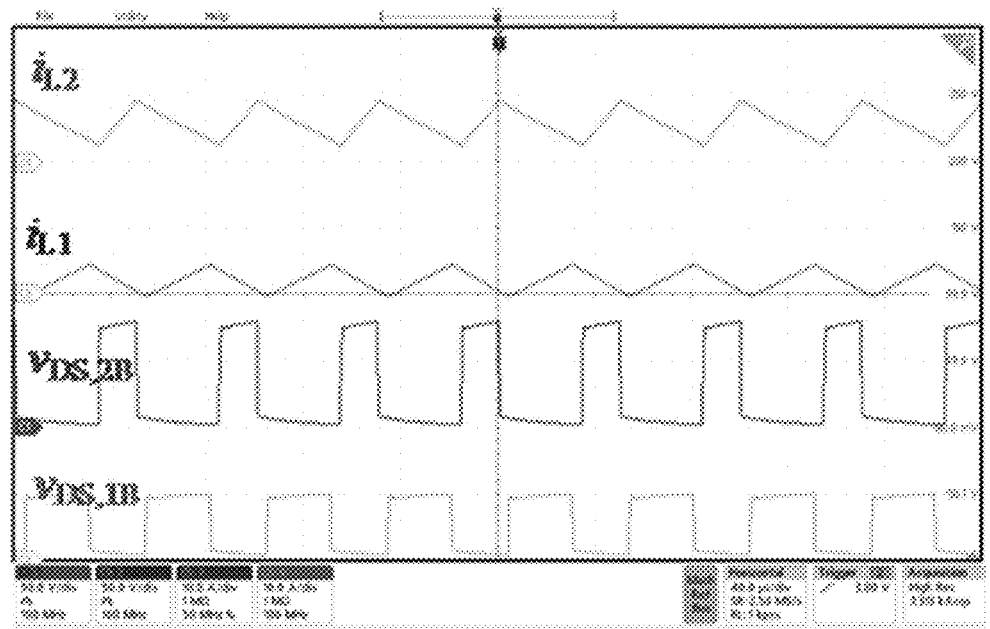
FIG. 12 is a waveform diagram of performance of a converter in accordance with various examples.

FIG. 11A shows steady-state performance of the converter 102 in an example of the SISO single input single output operation mode, in which the load 104 is sourcing power from the second source 106. In the example shown in FIG. 11A, switch 206 was active under high-frequency operation and switch 216 was a synchronized switch in a synchronous switching scheme used for control of the converter 102. FIG. 11B shows the steady-state performance of the converter 102 in an example of the DISO operating mode, in which the load 104 is sourcing power from the first source 108 and the second source 106. The inductor currents ($i_{L2}$ and $i_{L1}$) have a 180-phase difference, and the duty in the first cell (e.g., for power conversion between the first source 108 and the load 104) is less than in examples of a power converter that lacks support for a multi-input arrangement as shown by the converter 102. Device voltage stress corresponding to the operation shown in FIG. 11B is shown in FIG. 12, which is a waveform diagram of performance of the converter 102 in accordance with various examples. As shown by FIG. 12, component stress (shown as a drain-to-source voltage ($v_{DS,2B}$)) in the switch 218 is greater than component stress (shown as a drain-to-source voltage ($v_{DS,1B}$)) in the switch 208, such as resulting from the second source 106 being applied to assist the first source 108 in providing power to the load 104.

Figure 13:
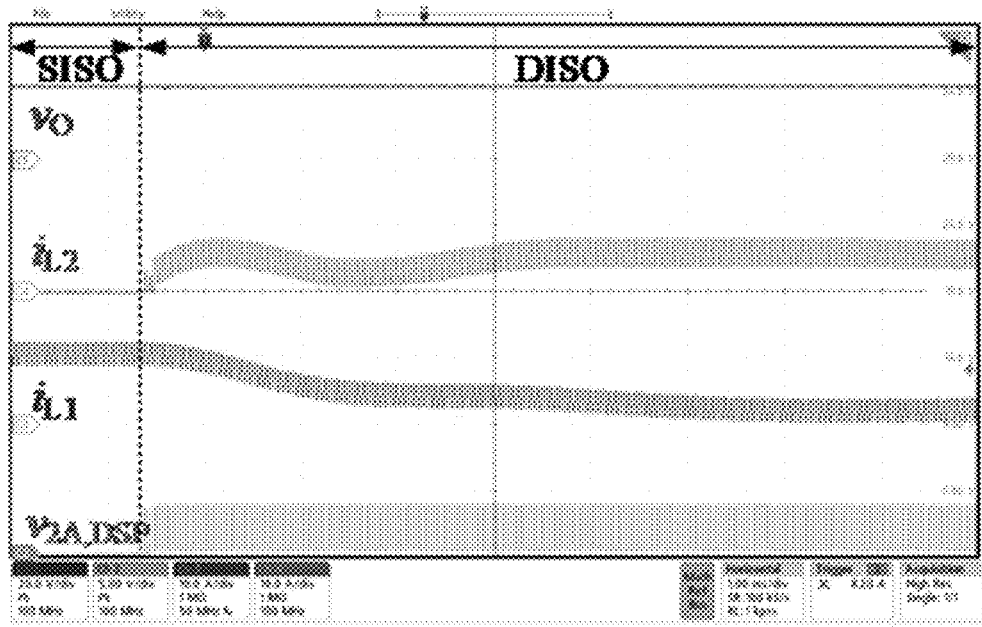
FIG. 13 is a waveform diagram of performance of a converter in accordance with various examples.

FIG. 13 is a waveform diagram of performance of the converter 102 in accordance with various examples. In some examples, FIG. 13 is representative of operation of the converter 102 in a transition from SISO to DISO operation modes. FIG. 13 includes $V_{DC}$, $i_{L2}$, and $i_{L1}$, each as described above, as well as $V_{2A,DSP}$. FIG. 13 corresponds to an implementation of the system 100 in which in second source 106 is a photovoltaic panel which experiences an increase in irradiation from 0 W/m2 to 1000 W/m2. As shown by FIG. 13, after the step change in irradiation, the converter 102 recovers to a steady-state with a stable transient performance.

Figure 14:
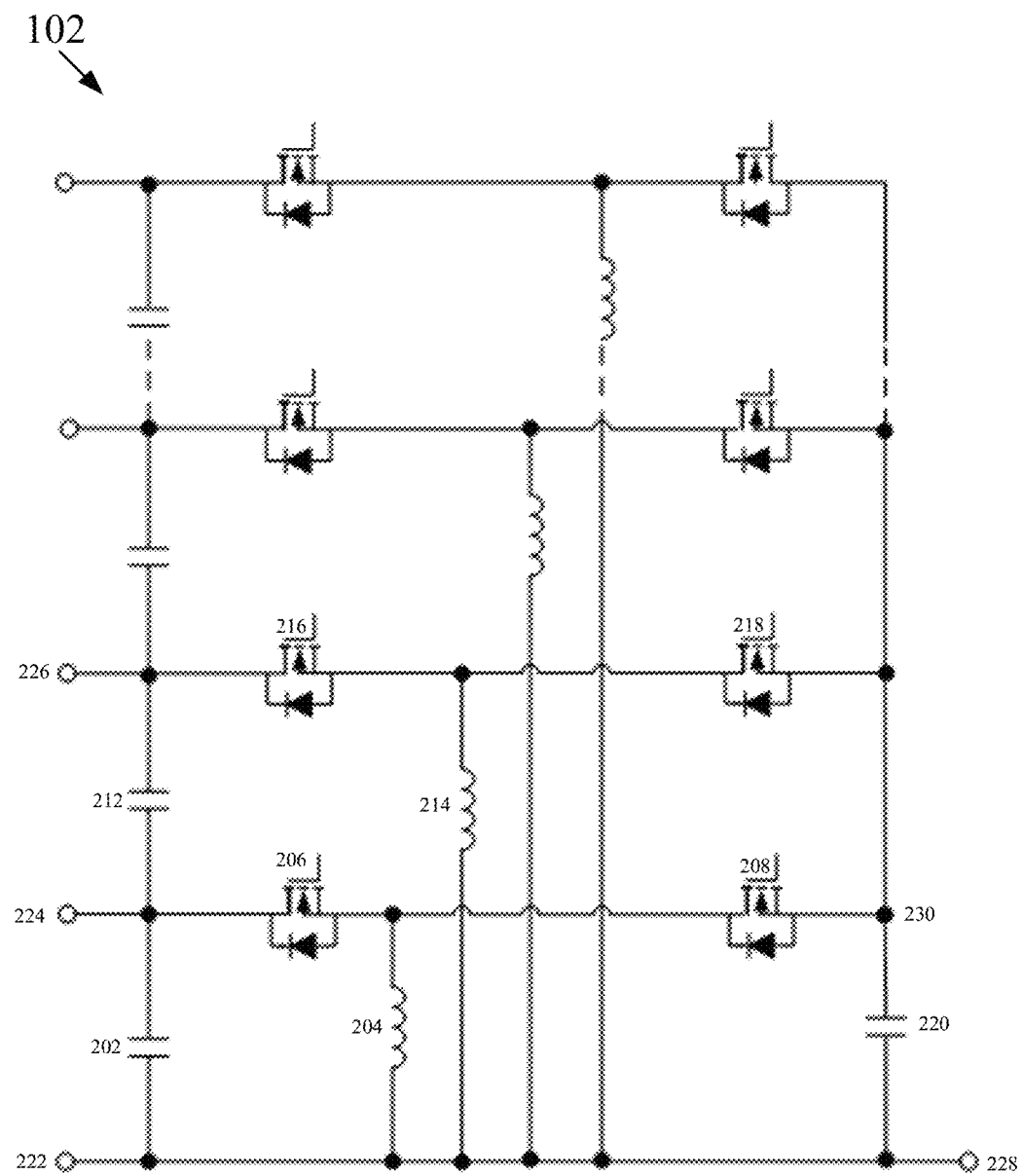
FIG. 14 is a schematic diagram of a converter, in accordance with various examples.

Returning now to FIG. 8, the converter 102 has been described as a three-port device capable of coupling to a first source 108, a second source 106, and a load 104. However, as shown in FIG. 14, in some examples the converter 102 is an n-port device, where the converter 102 is capable of coupling to n−1 sources and a load. To form the n-port device, a cell of the converter 102 (e.g., a combination of the capacitor 202, inductor 204, switch 206, and switch 208, or a combination of the capacitor 212, inductor 214, switch 216, and switch 218) may be replicated and coupled as shown in FIG. 14. Such an example facilitates the inclusion of additional sources for providing power to another source and/or to the load 104. For example, the converter 102 as shown in FIG. 14 may be suitable for coupling to multiple photovoltaic panels, as well as one or more batteries, to switch power to the load 104.

Figure 15:
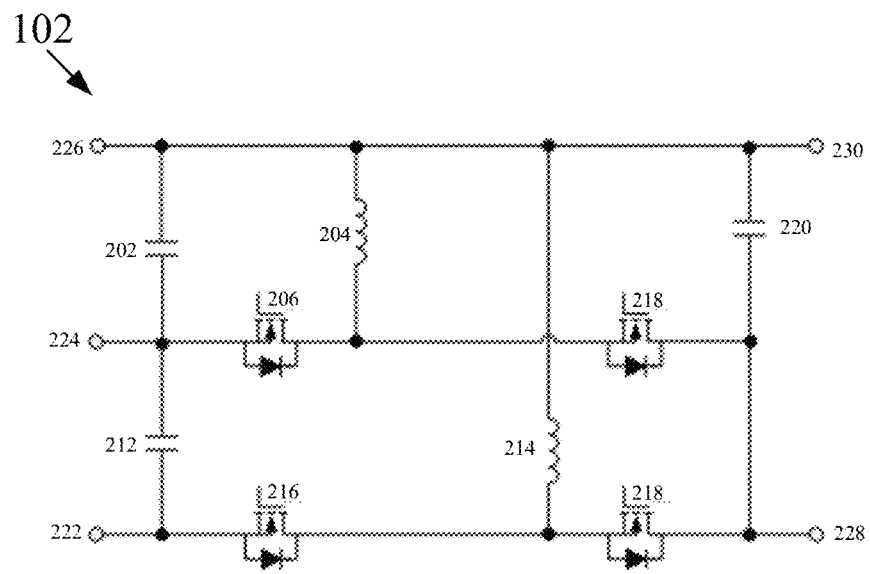
FIG. 15 is a schematic diagram of a converter, in accordance with various examples.
Figure 16:
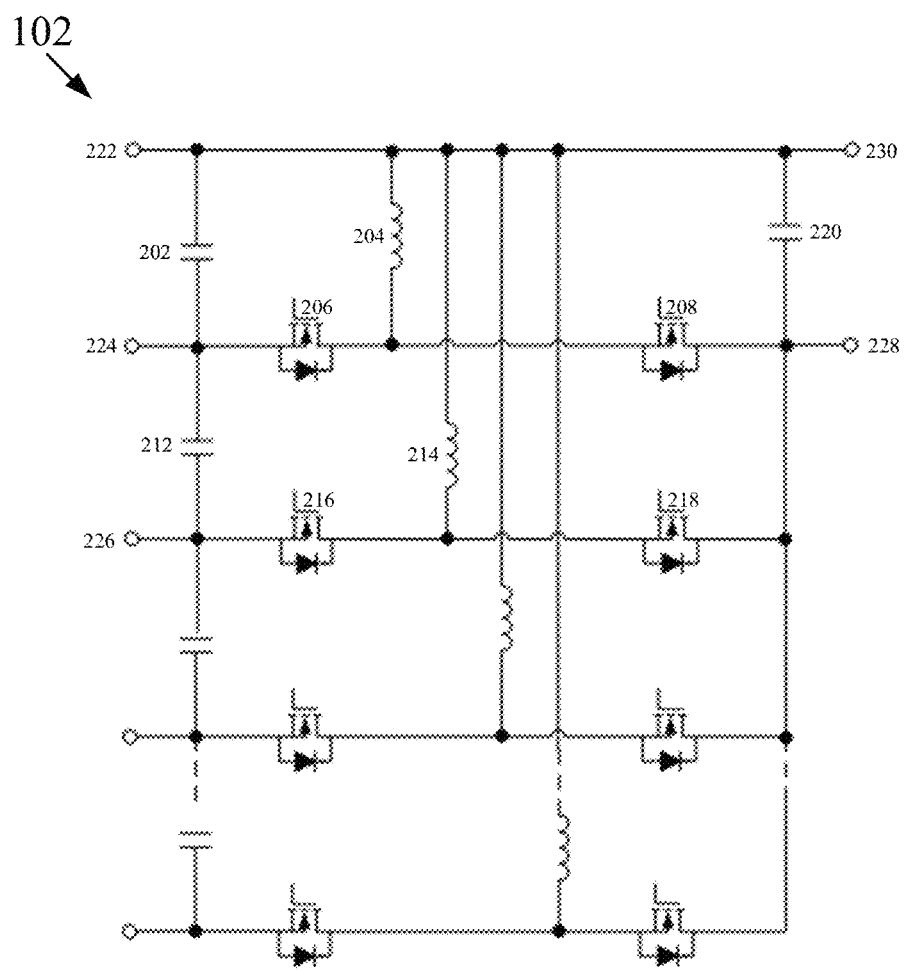
FIG. 16 is a schematic diagram of a converter, in accordance with various examples.

FIG. 15 is a schematic diagram of the converter 102, in accordance with various examples. In some examples, the converter 102 of FIG. 15 is an alternative example to the examples provided above in FIG. 8. The converter 102 of FIG. 15 is an example of a minimal implementation of a buck-boost topology suitable for performing the multi-port operation described herein. Two buck-boost conversion circuits are formed, the first including capacitor 202, inductor 204, switch 206, and switch 208, and the second including capacitor 212, inductor 214, switch 216, and 218. In some examples, increased performance of the power converter 102 of FIG. 15 may be obtained by coupling a first source having a lower voltage rating in parallel with the capacitor 212 and a second source having a higher voltage rating in parallel with the capacitor 202. As shown in FIG. 16, in some examples the converter 102 is an n-port device, where the converter 102 is capable of coupling to n−1 sources and a load. To form the n-port device, a buck-boost conversion circuit of the converter 102 (e.g., a combination of the capacitor 202, inductor 204, switch 206, and switch 208, or a combination of the capacitor 212, inductor 214, switch 216, and switch 218) may be replicated and coupled as shown in FIG. 16. Such an example facilitates the inclusion of additional sources for providing power to another source and/or to the load 104. For example, the converter 102 as shown in FIG. 16 may be suitable for coupling to multiple photovoltaic panels, as well as one or more batteries, to switch power to the load 104.

Depend on applications, the buck-boost topology shown in FIG. 15 and FIG. 16 may be replaced by a buck topology, as shown in FIGS. 17 and 18, or a boost topology, as shown in FIGS. 19 and 20.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or a semiconductor component. Furthermore, a voltage rail or more simply a "rail," may also be referred to as a voltage terminal and may generally mean a common node or set of coupled nodes in a circuit at the same potential.

What is claimed is:

1. A circuit, comprising:
  a first power converter cell, comprising:
    a first capacitor having first and second terminals, the first terminal of the first capacitor coupled to a first node and the second terminal of the first capacitor coupled to a second node;
    a first inductor having first and second terminals, the first terminal of the first inductor coupled to the first node;
    a first switch having a control terminal and first and second terminals, the first terminal of the first switch coupled to the second terminal of the first inductor, and the second terminal of the first switch coupled to the second node; and
    a second switch having a control terminal and first and second terminals, the first terminal of the second switch coupled to a third node, and the second terminal of the second switch coupled to the second terminal of the first inductor;
  a second power converter cell, comprising:
    a second capacitor having first and second terminals, the first terminal of the second capacitor coupled to a fourth node and the second terminal of the second capacitor coupled to the first node;
    a second inductor having first and second terminals, the first terminal of the second inductor coupled to the fourth node;
    a third switch having a control terminal and first and second terminals, the first terminal of the third switch coupled to the second terminal of the second inductor, and the second terminal of the third switch coupled to the second node; and
    a fourth switch having a control terminal and first and second terminals, the first terminal of the fourth switch coupled to the third node, and the second terminal of the fourth switch coupled to the second terminal of the second inductor;
  wherein the first and second nodes form a first bidirectional interface, the second and third nodes form a second bidirectional interface, and the first and fourth nodes form a third bidirectional interface;
  a photovoltaic source coupled to the third bidirectional interface;
  an energy storage element coupled to the first bidirectional interface; and
  a load coupled to the second bidirectional interface.

2. The circuit of claim 1, wherein the first through fourth switches are each implemented as silicon metal oxide semiconductor field effect transistors.

3. The circuit of claim 1, further comprising a controller having a first output coupled to the control terminal of the first switch, a second output coupled to the control terminal of the second switch, a third output coupled to the control terminal of the third switch, and a fourth output coupled to the control terminal of the fourth switch.

4. The circuit of claim 1, wherein the circuit is configured to:
  receive control signals from a controller at respective control terminals of the first through fourth switches, wherein the control signals cause the first through fourth switches to be configured to:
    in a first operation mode, provide power from the first bidirectional interface to the second bidirectional interface while providing power from the third bidirectional interface to the second bidirectional interface;
    in a second operation mode, provide power from the third bidirectional interface to the first bidirectional interface and to the second bidirectional interface;
    in a third operation mode, provide power from the third bidirectional interface to the first bidirectional interface;
    in a fourth operation mode, provide power from the first bidirectional interface to the second bidirectional interface;
    in a fifth operation mode, provide power from the second bidirectional interface to the first bidirectional interface; and
    in a sixth operation mode, provide power from the third bidirectional interface to the second bidirectional interface without concurrently providing power form the first bidirectional interface to the second bidirectional interface.

5. The circuit of claim 4, wherein in the first operation mode, providing power from the first bidirectional interface to the second bidirectional interface while providing power from the third bidirectional interface to the second bidirectional interface reduces a conversion ratio between the first bidirectional interface and the second bidirectional interface.

6. A circuit, comprising:
  a first power converter cell, comprising:
    a first capacitor having first and second terminals, the first terminal of the first capacitor coupled to a first node and the second terminal of the first capacitor coupled to a second node;
    a first switch having a control terminal and first and second terminals, the first terminal of the first switch coupled to the first node;
    a first inductor having first and second terminals, the first terminal of the first inductor coupled to the second terminal of the first switch, and the second terminal of the first inductor coupled to the second node; and
    a second switch having a control terminal and first and second terminals, the first terminal of the second switch coupled to the second terminal of the first switch, and the second terminal of the second switch coupled to a third node; and a second power converter cell, comprising:
a second capacitor having first and second terminals, the first terminal of the second capacitor coupled to a fourth node and the second terminal of the second capacitor coupled to the first node;
a third switch having a control terminal and first and second terminals, the first terminal of the third switch coupled to the fourth node;
a second inductor having first and second terminals, the first terminal of the second inductor coupled to the second terminal of the third switch, and the second terminal of the second inductor coupled to the second node; and
a fourth switch having a control terminal and first and second terminals, the first terminal of the fourth switch coupled to the second terminal of the third switch, and the second terminal of the fourth switch coupled to the third node;
wherein the first and second nodes form a first bidirectional interface, the second and third nodes form a second bidirectional interface, and the first and fourth nodes form a third bidirectional interface; and wherein the circuit is configured to receive control signals from a controller at respective control terminals of the first through fourth switches, wherein the control signals cause the first through fourth switches to be configured to:
in a first operation mode, provide power from the first bidirectional interface to the second bidirectional interface while providing power from the third bidirectional interface to the second bidirectional interface;
in a second operation mode, provide power from the third bidirectional interface to the first bidirectional interface and to the second bidirectional interface;
in a third operation mode, provide power from the third bidirectional interface to the first bidirectional interface;
in a fourth operation mode, provide power from the first bidirectional interface to the second bidirectional interface;
in a fifth operation mode, provide power from the second bidirectional interface to the first bidirectional interface; and
in a sixth operation mode, provide power from the third bidirectional interface to the second bidirectional interface without concurrently providing power form the first bidirectional interface to the second bidirectional interface.

7. The circuit of claim 6, wherein the first through fourth switches are each implemented as silicon metal oxide semiconductor field effect transistors.

8. The circuit of claim 6, wherein the controller comprises a first output coupled to the control terminal of the first switch, a second output coupled to the control terminal of the second switch, a third output coupled to the control terminal of the third switch, and a fourth output coupled to the control terminal of the fourth switch.

9. The circuit of claim 6, wherein in the first operation mode, providing power from the first bidirectional interface to the second bidirectional interface while providing power from the third bidirectional interface to the second bidirectional interface reduces a conversion ratio between the first bidirectional interface and the second bidirectional interface.

10. The circuit of claim 6, further comprising:
a photovoltaic source coupled to the third bidirectional interface;
an energy storage element coupled to the first bidirectional interface; and
a load coupled to the second bidirectional interface.

11. A circuit, comprising:
a first power converter cell having a first bidirectional interface, wherein the first power converter cell is configured to switch power from the first bidirectional interface to a second bidirectional interface in a first operation mode; and
a second power converter cell having a third bidirectional interface, the second power converter cell configured to switch power from the third bidirectional interface to the second bidirectional interface in the first operation mode in parallel with the first power converter cell;
wherein:
the first power converter cell comprises:
a first capacitor having first and second terminals, the first terminal of the first capacitor coupled to a first node and the second terminal of the first capacitor coupled to a second node;
a first inductor having first and second terminals, the second terminal of the first inductor coupled to the second node;
a first switch having a control terminal and first and second terminals, the first terminal of the first switch coupled to the first node, and the second terminal of the first switch coupled to the first terminal of the first inductor; and
a second switch having a control terminal and first and second terminals, the first terminal of the second switch coupled to the first terminal of the first inductor, and the second terminal of the second switch coupled to a third node; and
the second power converter cell comprises:
a second capacitor having first and second terminals, the first terminal of the second capacitor coupled to a fourth node and the second terminal of the second capacitor coupled to the second node;
a second inductor having first and second terminals, the second terminal of the second inductor coupled to the fourth node;
a third switch having a control terminal and first and second terminals, the first terminal of the third switch coupled to the first node, and the second terminal of the third switch coupled to the first terminal of the second inductor; and
a fourth switch having a control terminal and first and second terminals, the first terminal of the fourth switch coupled to the second terminal of the third switch, and second terminal of the fourth switch coupled to the third node;
wherein the first and second nodes form the first bidirectional interface, the first and third nodes form the second bidirectional interface, and the second and fourth nodes form the third bidirectional interface.

12. The circuit of claim 11, wherein:
in a second operation mode, the second power converter cell is configured to provide power from the third bidirectional interface to the first bidirectional interface and to the second bidirectional interface;
in a third operation mode, the second power converter cell is configured to provide power from the third bidirectional interface to the first bidirectional interface;

in a fourth operation mode, the first power converter cell is configured to provide power from the first bidirectional interface to the second bidirectional interface;

in a fifth operation mode, the first power converter cell is configured to provide power from the second bidirectional interface to the first bidirectional interface; and in a sixth operation mode, the second power converter cell is configured to provide power from the third bidirectional interface to the second bidirectional interface without the first power converter cell concurrently providing power form the first bidirectional interface to the second bidirectional interface.

13. A circuit, comprising:

a first power converter cell having a first bidirectional interface, wherein the first power converter cell is configured to switch power from the first bidirectional interface to a second bidirectional interface in a first operation mode; and a second power converter cell having a third bidirectional interface, the second power converter cell configured to switch power from the third bidirectional interface to the second bidirectional interface in the first operation mode in parallel with the first power converter cell, wherein:

the first power converter cell comprises:

a first capacitor having first and second terminals, the first terminal of the first capacitor coupled to a first node and the second terminal of the first capacitor coupled to a second node;

a first switch having a control terminal and first and second terminals, the second terminal of the first switch coupled to the second node;

a first inductor having first and second terminals, the first terminal of the first inductor coupled to the first node, and the second terminal of the first inductor coupled to the first terminal of the first switch; and a second switch having a control terminal and first and second terminals, the first terminal of the second switch coupled to a third node, and the second terminal of the second switch coupled to the first terminal of the first switch; and the second power converter cell comprises:

a second capacitor having first and second terminals, the first terminal of the second capacitor coupled to the second node and the second terminal of the second capacitor coupled to a fourth node;

a third switch having a control terminal and first and second terminals, the second terminal of the third switch coupled to the fourth node;

a second inductor having first and second terminals, the first terminal of the second inductor coupled to the first node, and the second terminal of the second inductor coupled to the first terminal of the third switch; and a fourth switch having a control terminal and first and second terminals, the first terminal of the fourth switch coupled to the third node, and the second terminal of the fourth switch coupled to the first terminal of the third switch;

wherein the first and second nodes form the first bidirectional interface, the second and fourth nodes form the third bidirectional interface, and the first and third nodes form the second bidirectional interface.

* * * * *